United States Patent
Boloorian

(10) Patent No.: US 11,860,277 B1
(45) Date of Patent: Jan. 2, 2024

(54) DYNAMIC WINDOW FOR LIDAR DATA GENERATION

(71) Applicant: SiLC Technologies, Inc., Monrovia, CA (US)

(72) Inventor: Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 415 days.

(21) Appl. No.: 17/195,610

(22) Filed: Mar. 8, 2021

(51) Int. Cl.
*G01P 3/36* (2006.01)
*G01S 17/58* (2006.01)
*G01S 7/48* (2006.01)

(52) U.S. Cl.
CPC .............. *G01S 17/58* (2013.01); *G01S 7/4804* (2013.01); *G01S 7/4808* (2013.01)

(58) Field of Classification Search
None
See application file for complete search history.

(56) References Cited

U.S. PATENT DOCUMENTS

| | | | |
|---|---|---|---|
| 2021/0405194 A1* | 12/2021 | Tsuchida | G01S 17/58 |
| 2022/0113422 A1* | 4/2022 | Hillard | G01S 7/4911 |
| 2022/0187458 A1* | 6/2022 | Piggott | G01S 7/4865 |

FOREIGN PATENT DOCUMENTS

| | | | | |
|---|---|---|---|---|
| JP | 2020085723 A | * | 6/2020 | ............ G01S 17/34 |
| JP | 2021032848 A | * | 3/2021 | ............ G01S 17/10 |

* cited by examiner

*Primary Examiner* — Mark Hellner
(74) *Attorney, Agent, or Firm* — Gavrilovich, Dodd & Lindsey LLP

(57) ABSTRACT

A LIDAR system is configured to output a system output signal and to receive a system return signal. The system return signal includes light that was included in the system output signal and that was reflected by an object located outside of the LIDAR system. A time delay occurs between the light being output from the LIDAR system and returning to the LIDAR system. The LIDAR system also includes electronics that use a portion of the system return signal that returns to the LIDAR system during a data window to generate LIDAR data that indicates a radial velocity and/or distance between the LIDAR system and the object. The electronics tune the duration of the data window in response to the amount of the time delay.

30 Claims, 11 Drawing Sheets

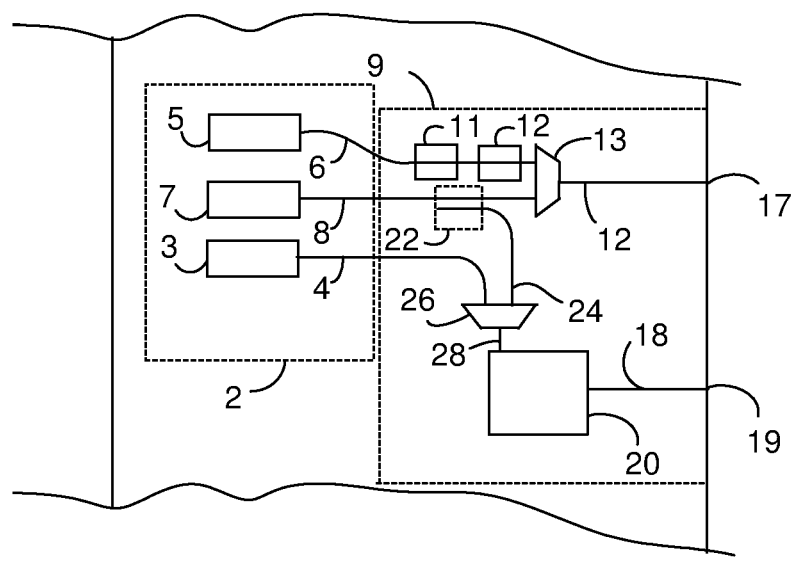
Figure 1
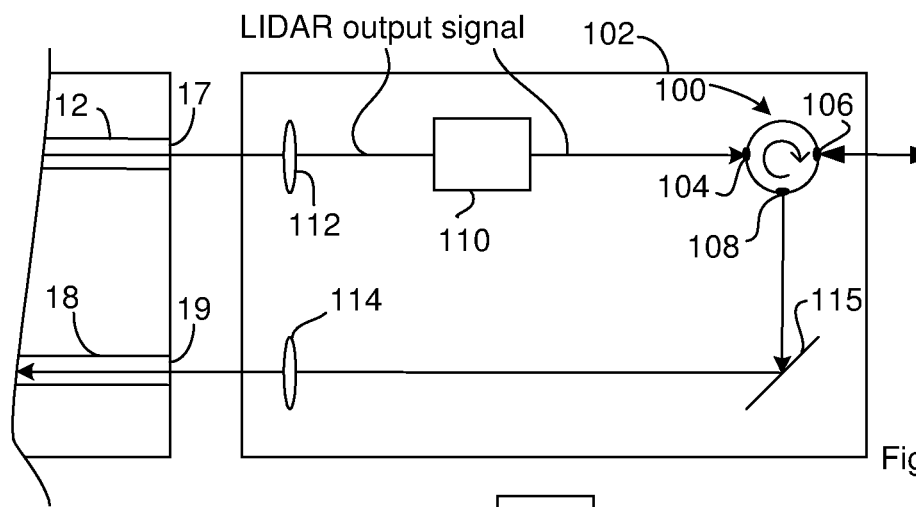
Figure 2
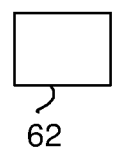

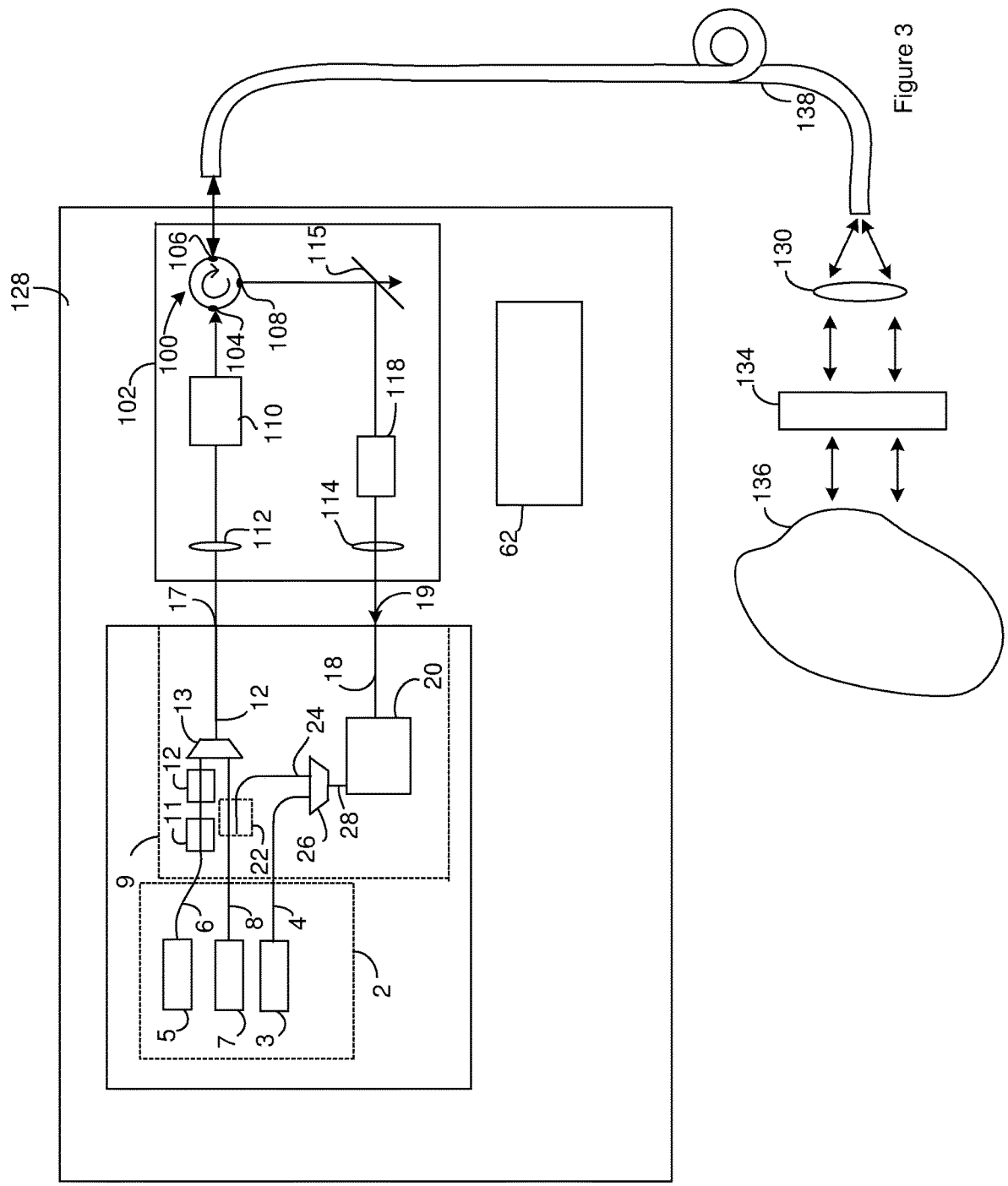

| $p_{1,1}$ associated with $s_{1,1}$ | $p_{1,2}$ associated with $s_{1,2}$ | $p_{2,1}$ associated with $s_{2,1}$ | $p_{2,2}$ associated with $s_{2,2}$ | $p_{3,1}$ associated with $s_{3,1}$ |
|---|---|---|---|---|
| 0   $d_{0,1}$   $d_{0,2}$   0<br>   0    $f_1$    $f_2$   0<br>———————<br>$(f_1)(d_{0,2}) = v_{0,3}$<br>0   $d_{1,1}$   $d_{1,2}$   0<br>0    $f_1$    $f_2$    0<br>———————<br>$(d_{1,1})(f_2) = v_{1,1}$ | 0   $d_{1,1}$   $d_{1,2}$   0<br>0    $f_1$    $f_2$    0<br>———————<br>$d_{1,1}f_1 +$<br>$d_{1,2}f_2 = v_{1,2}$ | 0   $d_{1,1}$   $d_{1,2}$   0<br>   0    $f_1$    $f_2$   0<br>———————<br>$(f_1)(d_{1,2}) = v_{1,3}$ | | |
| | | 0   $d_{2,1}$   $d_{2,2}$   0<br>0    $f_1$    $f_2$    0<br>———————<br>$(d_{2,1})(f_2) = v_{2,1}$ | 0   $d_{2,1}$   $d_{2,2}$   0<br>0    $f_1$    $f_2$    0<br>———————<br>$d_{2,1}f_1 +$<br>$d_{2,2}f_2 = v_{2,2}$ | 0   $d_{2,1}$   $d_{2,2}$   0<br>   0    $f_1$    $f_2$   0<br>———————<br>$(f_1)(d_{2,2}) = v_{2,3}$<br>0   $d_{3,1}$   $d_{3,2}$   0<br>0    $f_1$    $f_2$    0<br>———————<br>$(d_{3,1})(f_2) = = v_{3,1}$ |
| $(d_{0,1})(d_{0,2}) +$<br>$(d_{1,1})(d_{1,2}) = p_{1,1}$ | $d_{1,1}f_1 +$<br>$d_{1,2}f_2 = p_{1,2}$ | $d_{1,2}f_1 +$<br>$d_{2,1}f_2 = p_{2,1}$ | $d_{2,1}f_1 +$<br>$d_{2,2}f_2 = p_{2,2}$ | $(f_1)(d_{2,2}) +$<br>$(d_{3,1})(f_2) =$<br>$p_{3,1}$ |

Figure 4I

DYNAMIC WINDOW FOR LIDAR DATA GENERATION

FIELD

The invention relates to optical devices. In particular, the invention relates to LIDAR systems.

BACKGROUND

LIDAR systems generate LIDAR data that indicates a radial velocity and/or distance between the LIDAR system and an object. These LIDAR systems are being adopted in an increasing variety of applications such self-driving cars. In order to be successfully employed in many of these applications, the LIDAR data produced by the system must be highly reliable. However, current LIDAR systems have not produced the desired levels of data reliability. As a result, there is a need for a LIDAR system with an improved level of LIDAR data reliability.

SUMMARY

A LIDAR system is configured to output a system output signal and to receive a system return signal. The system return signal includes light that was included in the system output signal and that was reflected by an object located outside of the LIDAR system. A time delay occurs between the light being output from the LIDAR system and returning to the LIDAR system. The LIDAR system also includes electronics that use a portion of the system return signal that returns to the LIDAR system during a data window to generate LIDAR data that indicates a radial velocity and/or distance between the LIDAR system and the object. The electronics tune the duration of the data window in response to the amount of the time delay.

A method of operating a LIDAR system includes outputting a system output signal from a LIDAR system and receiving a system return signal at the LIDAR system. The system return signal includes light that was included in the system output signal and that was reflected by an object located outside of the LIDAR system. A time delay occurs between the light being output from the LIDAR system and returning to the LIDAR system. The method also includes generating LIDAR data from a portion of the system return signal that returns to the LIDAR system during a data window. The LIDAR data indicates a radial velocity and/or distance between the LIDAR system and the object. Generating the LIDAR data includes tuning the duration of the data window in response to the amount of the time delay.

BRIEF DESCRIPTION OF THE FIGURES

FIG. 1 is a topview of a schematic of a LIDAR chip that can serve as a LIDAR system or can be included in a LIDAR system that includes components in addition to the LIDAR chip.

FIG. 2 is a topview of an example of a LIDAR adapter that is suitable for use with the LIDAR chip of FIG. 1.

FIG. 3 is a topview of a LIDAR system that includes the LIDAR chip of FIG. 1 and the LIDAR adapter of FIG. 2 on a common mount.

FIG. 4I provides an example of a convolution.

DESCRIPTION

Figure 4A:
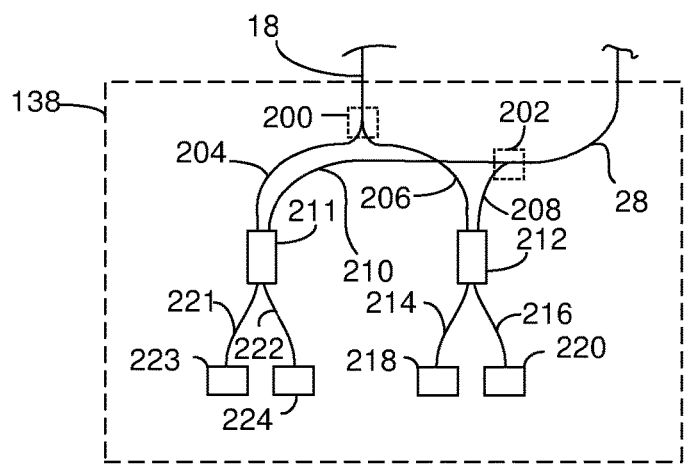
FIG. 4A is a schematic of an example of a suitable processing unit for use in a LIDAR system.

A LIDAR system is configured to output a system output signal and to receive a system return signal. The system return signal includes light that was included in the system output signal and that was reflected by an object located outside of the LIDAR system. A time delay occurs between the light being output from the LIDAR system and returning to the LIDAR system.

The LIDAR system also includes electronics that generate LIDAR data from the system return signal. The LIDAR data is generated from a portion of the system return signal that returns to the LIDAR system during a data window. The electronics tune the duration of the data window in response to the amount of the time delay. For instance, the electronics can tune the duration of the data window such that the duration of the data window increases for shorter time delays.

When the duration of the data window is fixed rather than tuned, the duration of the data window needs to be undesirably short. The amount of the time delay changes in response to the distance between the LIDAR system and the reflecting object. For instance, the time delay increases as the separation distance increases. As a result, as the separation distance increases it becomes possible that the system return signal has not yet returned to the LIDAR system while the data window is open. To prevent this situation, the duration of the fixed data window is reduced to ensure that the system return signals are returning to the LIDAR system for the full duration of the data window. However, the shortened duration of the fixed data window means that the system return signals are often returning to the LIDAR system outside of the fixed data window. As a result, a portion of the return signal is not taken into account when generating the LIDAR data. Tuning the duration of the data window allows a larger portion of a returning system return signal to be used in the generation of the LIDAR data. Increasing the portion of a returning system return signal that is used in generating LIDAR data increases the reliability of the LIDAR data.

FIG. 1 is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip.

The LIDAR chip includes a light system 2 that includes a synchronization reference light source 3 configured to output a synchronization reference signal on a synchronization reference waveguide 4. The light system 2 also includes a synchronization light source 5 configured to output a synchronization signal on a synchronization waveguide 6. The light system 2 also includes a light source 7 configured to output a LIDAR signal on a source waveguide 8. The synchronization reference signal, the synchronization signal, and the LIDAR signal can each have a different wavelength.

The source waveguide 8 carries the LIDAR signal to a LIDAR engine 9 that processes the light signals from which the LIDAR data is generated. The LIDAR engine 9 includes a phase modulator 11 positioned along the synchronization waveguide 6. The phase modulator 11 is configured to modulate the phase of the synchronization signal such that the phase modulator 11 outputs a modulated signal carried on the synchronization waveguide 6. Suitable phase modulators 11 include, but are not limited to, Mach Zehnder modulators, PIN diodes operated in forward bias (carrier injection) mode, PN diodes operated in reverse bias (depletion) mode and devices based on electro-optic materials such as lithium niobate, and III-V based active devices such as semiconductor optical amplifiers (SOA).

An intensity modulator 12 is optionally positioned along the synchronization waveguide 6 and is configured to modulate the intensity of the modulated signal and output the result on the synchronization waveguide 6 as an outgoing synchronization signal. The intensity modulator 12 can be configured to pass the synchronization signal without substantial attenuation or to attenuate the synchronization signal. Accordingly, an attenuated version or an unattenuated version of the synchronization signal can serve as the outgoing synchronization signal. In some instances, the intensity modulator is configured to pass the outgoing synchronization signal on the synchronization waveguide 6 as the outgoing synchronization signal without substantial attenuation and/or to attenuate the synchronization signal such that a light signal is not output on the synchronization waveguide 6 or is effectively not output on the synchronization waveguide 6. Suitable intensity modulators 16 include, but are not limited to, PIN diodes operated in forward bias (carrier injection) mode, PN diodes operated in reverse bias (depletion) mode and devices based on electro-optic materials such as lithium niobate.

The LIDAR engine 9 includes a combiner 13 that receives the outgoing synchronization signal from the synchronization waveguide 6 and also receives the LIDAR signal from the source waveguide 8. The combiner is configured to combine the outgoing synchronization signal and the LIDAR signal into an outgoing LIDAR signal that is carried on a utility waveguide. Accordingly, the outgoing LIDAR signal has a contribution from the outgoing synchronization signal and the LIDAR signal. Suitable combiners include, but are not limited to, 1×2 y-junction couplers, 1×2 Multimode Interference (MMI) couplers, Wavelength Division Multiplexer (WDM) components such as echelle gratings, Arrayed Waveguide Gratings (AWGs) or Mach-Zehnder Interferometers (MZIs).

The LIDAR engine 9 includes a facet 17 at which the utility waveguide 12 terminates. The utility waveguide 12 carries the outgoing LIDAR signal to the facet 17. The facet 17 can be positioned such that the outgoing LIDAR signal traveling through the facet 17 exits the LIDAR chip and serves as a LIDAR output signal. For instance, the facet 17 can be positioned at an edge of the chip so the outgoing LIDAR signal traveling through the facet 17 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

Light from the LIDAR output signal travels away from the LIDAR system in the system output signal. The system output signal can travel through free space in the atmosphere in which the LIDAR system is positioned. The system output signal may be reflected by one or more objects in the path of the system output signal. When the system output signal is reflected, at least a portion of the reflected light travels back toward the LIDAR chip as a system return signal.

Light from the system return signal can be carried in a first LIDAR input signal that is received by the LIDAR chip. In some instances, a portion of the system return signal can serve as the first LIDAR input signal. The LIDAR engine 9 includes a comparative waveguide 18 that terminates at a facet 19. The first LIDAR input signals enters the comparative waveguide 18 through the facet 19 and serves as a comparative signal. The comparative waveguide 18 carries the comparative signal to a processing unit 20 configured to convert the optical signals to electrical signals from which LIDAR data (the radial velocity and/or distance between the LIDAR system and one or more objects located outside of the LIDAR system) is generated.

A splitter 22 is positioned along the source waveguide 8 and is configured to move a portion of the LIDAR signal from the source waveguide 8 onto a LIDAR reference waveguide 24 as a LIDAR reference signal. The percentage of light transferred from the source waveguide 8 by the splitter 22 can be fixed or substantially fixed. For instance, the splitter 22 can be configured such that the power of the LIDAR signal transferred to the LIDAR reference waveguide 24 is a percentage of the power of the LIDAR signal. In some instances, the percentage is greater than 1%, 10% or 20 and/or less than 50%, or 60%. Suitable splitters 22 include, but are not limited to, optical couplers, y-junctions, tapered couplers, and Multi-Mode Interference (MMI) devices.

The LIDAR reference waveguide 24 carries the LIDAR reference signal to a second combiner 26. The second combiner 26 also receives the synchronization reference signal from the synchronization reference waveguide 4. The second combiner 26 is configured to combine the synchronization reference signal and the LIDAR reference signal into a reference signal that is carried on a reference waveguide 28. The reference waveguide 28 carries the reference signal to the processing unit 20 for further processing. Accordingly, the reference signal has a contribution from the synchronization reference signal and the LIDAR reference signal. Suitable combiners include, but are not limited to, y-junctions, tapered couplers, Multi-Mode Interference (MMI) devices, Wavelength Division Multiplexers such as echelle gratings and Arrayed Waveguide Gratings (AWGs).

In some instances, a LIDAR chip constructed according to FIG. 1 is used in conjunction with a LIDAR adapter. In some instances, the LIDAR adapter can be physically and optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the system return signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view. Additionally or alternately, the LIDAR adapter can be configured to operate on the system return signal and the LIDAR output signal such that the second LIDAR input signal and the LIDAR output signal travel on different optical pathways between the LIDAR adapter and the LIDAR chip but on the same optical pathway between the LIDAR adapter and a reflecting object in the field of view.

An example of a LIDAR adapter that is suitable for use with the LIDAR chip of FIG. 1 is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106 as an assembly output signal.

The assembly output signal includes, consists of, or consists essentially of light from the LIDAR output signal received from the LIDAR chip. Accordingly, the assembly output signal may be the same or substantially the same as the LIDAR output signal received from the LIDAR chip. However, there may be differences between the assembly output signal and the LIDAR output signal received from the LIDAR chip. For instance, the LIDAR output signal can experience optical loss as it travels through the LIDAR adapter and/or the LIDAR adapter can optionally include an amplifier 110 configured to amplify the LIDAR output signal as it travels through the LIDAR adapter.

When one or more objects in the sample region reflect light from the assembly output signal, at least a portion of the reflected light travels back to the circulator 100 as an assembly return signal. At least a portion of the light from the assembly return signal enters the circulator 100 through the second port 106. FIG. 2 illustrates the LIDAR output signal and the assembly return signal traveling between the LIDAR adapter and the sample region along the same optical path.

The assembly return signal exits the circulator 100 through the third port 108 and is directed to the input waveguide 16 on the LIDAR chip. Accordingly, light from the assembly returned signal can serve as the first LIDAR input signal and the first LIDAR input signal includes or consists of light from the assembly return signal. Accordingly, the LIDAR output signal and the first LIDAR input signal travel between the LIDAR adapter and the LIDAR chip along different optical paths.

As is evident from FIG. 2, the LIDAR adapter can optionally include optical components in addition to the circulator 100. For instance, the LIDAR adapter can include components for directing and controlling the optical path of the LIDAR output signal and the LIDAR return signal. As an example, the adapter of FIG. 2 includes an optional amplifier 110 positioned so as to receive and amplify the LIDAR output signal before the LIDAR output signal enters the circulator 100. The amplifier 110 can be operated by electronics 62 allowing the electronics 62 to control the power of the LIDAR output signal.

The optical components can include one or more beam-shaping components. For instance, FIG. 2 illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal on the facet 19 of the input waveguide 16.

The LIDAR adapter can also include one or more direction changing components such as mirrors or prisms. FIG. 2 illustrates the LIDAR adapter including a mirror 115 as a direction-changing component 115 that redirects the LIDAR return signal from the circulator 100 to the facet 19 of the input waveguide 16.

The LIDAR chips include one or more waveguides that constrains the optical path of one or more light signals. While the LIDAR adapter can include waveguides, the optical path that the signals travel between components on the LIDAR adapter and/or between the LIDAR chip and a component on the LIDAR adapter can be free space. For instance, the signals can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, the components on the adapter can be discrete optical components that are attached to the base 102.

When the LIDAR system includes a LIDAR chip and a LIDAR adapter, the LIDAR chip, electronics, and the LIDAR adapter can be included in a LIDAR assembly where the LIDAR chip, the LIDAR adapter, and all or a portion of the electronics are positioned on a common mount 128. Suitable common mounts 128 include, but are not limited to, glass plates, metal plates, silicon plates and ceramic plates. As an example, FIG. 3 is a topview of a LIDAR system that includes the LIDAR chip and electronics 62 of FIG. 1 and the LIDAR adapter of FIG. 2 on a common mount 128.

Although FIG. 3 illustrates the electronics 62 as located on the common mount 128, all or a portion of the electronics can be located off the common mount 128. When the light system 2 is located off the LIDAR chip, the light system can be located on the common mount 128 or off of the common mount 128. Suitable approaches for mounting the LIDAR chip, electronics, and/or the LIDAR adapter on the common mount 128 include, but are not limited to, epoxy, solder, and mechanical clamping.

The LIDAR systems of FIG. 3 can include one or more system components that are at least partially located off the common mount 128. Examples of suitable system components include, but are not limited to, optical links, beam-shaping components, polarization state rotators, beam steering components, optical splitters, optical amplifiers, and optical attenuators. For instance, the LIDAR systems of FIG. 3 can include one or more beam-shaping components 130 that receive the assembly output signal from the adapter and output a shaped signal. The one or more beam-shaping components 130 can be configured to provide the shaped signal with the desired shape. For instance, the one or more beam-shaping components 130 can be configured to output a shaped signal that focused, diverging or collimated. In FIG. 3, the one or more beam-shaping components 130 is a lens that is configured to output a collimated shaped signal.

The LIDAR systems of FIG. 3 can optionally include one or more beam steering components 134 that receive the shaped signal from the one or more beam-shaping components 130 and that output the system output signal. For instance, FIG. 3 illustrates a beam steering component 134 that receives the shaped signal from a beam-shaping component 130. The electronics can operate the one or more beam steering components 134 so as to steer the system output signal to different sample regions 135. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Suitable beam steering components include, but are not limited to, movable mirrors, MEMS mirrors, optical phased arrays (OPAs), optical gratings, actuated optical gratings and actuators that move the LIDAR chip, LIDAR adapter, and/or common mount 128.

When the system output signal is reflected by an object 136 located outside of the LIDAR system and the LIDAR, at least a portion of the reflected light returns to the LIDAR system as a system return signal. When the LIDAR system includes one or more beam steering components 134, the one or more beam steering components 134 can receive at least a portion of the system return signal from the object 136. The one or more beam-shaping components 130 can receive at least a portion of the system return signal from the object 136 or from the one or more beam steering components 134 and can output the assembly return signal that is received by the adapter.

The LIDAR system of FIG. 3 includes an optional optical link 138 that carries optical signals to the one or more system components from the adapter, from the LIDAR chip, and/or from one or more components on the common mount. For instance, the LIDAR system of FIG. 3 includes an optical fiber configured to carry the assembly output signal to the beam-shaping components 130. The use of the optical link 138 allows the source of the system output signal to be located remote from the LIDAR chip. Although the illustrated optical link 138 is an optical fiber, other optical links 138 can be used. Other suitable optical links 138 include, but are not limited to, free space optical links and waveguides. When the LIDAR system excludes an optical link, the one or more beam-shaping components 130 can receive the assembly output signal directly from the adapter.

The above LIDAR systems includes a variety of optical components that can serve as output components through which the system output signal exits the LIDAR system. In some instances, depending on the configuration of the LIDAR system, a beam steering component 134, a beam-shaping component 130, a facet of an optional optical link 138 such as an optical fiber, a port of a circulator 100, or a facet of a utility waveguide can serve as an output component. In some instances, the output component also serves as an input component through which a system return enters the LIDAR system. For instance, in some instances, depending on the configuration of the LIDAR system, a beam steering component 134, a beam-shaping component 130, a facet of an optional optical link 138 such as an optical fiber, a port of a circulator 100, or a facet of a utility waveguide can serve as an input component.

Figure 4B:
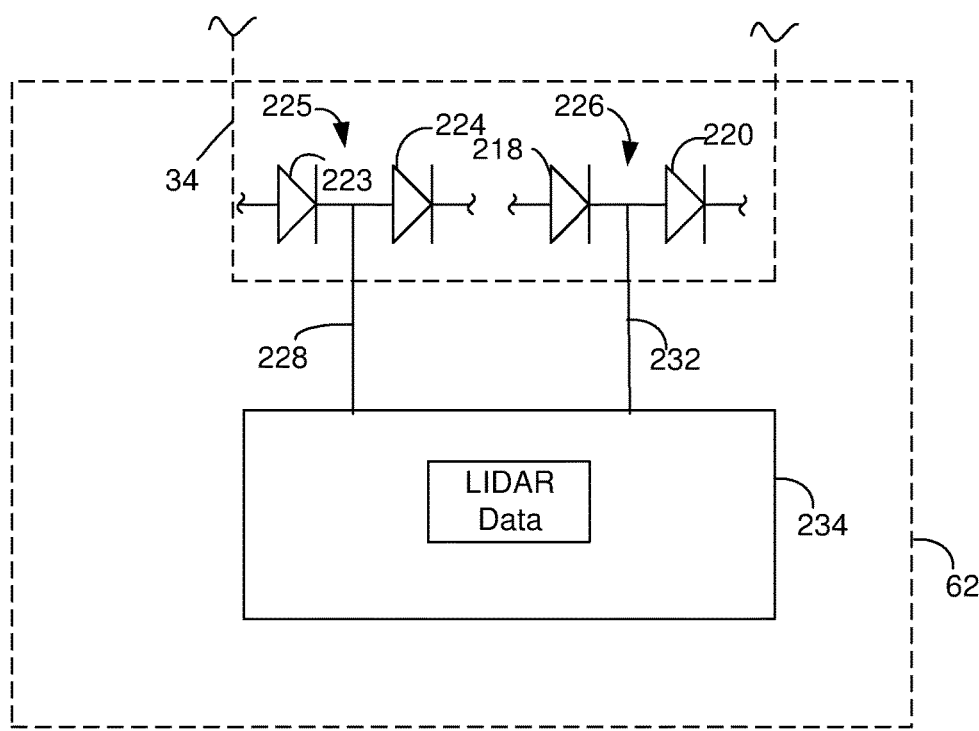
FIG. 4B is a schematic of the interface between the electronics and the light sensors in a processing unit.

FIG. 4A through FIG. 4B illustrate an example of a processing unit 20 that is suitable for use as the processing unit 20 in the above LIDAR systems. The processing unit 20 receives the comparative signal from the comparative waveguide 18 of FIG. 1 and the reference signal from the reference waveguide 24 of FIG. 1. The processing unit includes a second splitter 200 that divides the comparative signal carried on the comparative waveguide 150 onto a first comparative waveguide 204 and a second comparative waveguide 206. The first comparative waveguide 204 carries a first portion of the comparative signal to a first light-combining component 211. The second comparative waveguide 206 carries a second portion of the comparative signal to a second light-combining component 212.

The processing component includes a first splitter 202 that divides the reference signal carried on the reference waveguide 152 onto a first reference waveguide 210 and a second reference waveguide 208. The first reference waveguide 210 carries a first portion of the reference signal to the first light-combining component 211. The second reference waveguide 208 carries a second portion of the reference signal to the second light-combining component 212.

The second light-combining component 212 combines the second portion of the comparative signal and the second portion of the reference signal into a second composite signal. The second portion of the comparative signal includes a contribution from the LIDAR signal and the synchronization signal. Additionally, the second portion of the reference signal includes a contribution from the LIDAR reference signal and the synchronization reference signal. As a result, the second composite signal includes a contribution from the LIDAR signal, the LIDAR reference signal, the synchronization signal and the synchronization reference signal. Due to the difference in frequencies between the LIDAR signal contribution and the LIDAR reference signal contribution, the LIDAR signal contribution and the LIDAR reference signal contribution are beating at a LIDAR beat frequency.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. The first portion of the comparative signal includes a contribution from the LIDAR signal and the synchronization signal. Additionally, the first portion of the reference signal includes a contribution from the LIDAR reference signal and the synchronization reference signal. As a result, the first composite signal includes a contribution from the LIDAR signal, the LIDAR reference signal, the synchronization signal and the synchronization reference signal. Due to the difference in frequencies between the LIDAR signal contribution and the LIDAR reference signal contribution, the LIDAR signal contribution and the LIDAR reference signal contribution are beating at a LIDAR beat frequency.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

In some instances, the first light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the first light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the first light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the first light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90° phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

FIG. 4B provides a schematic of the relationship between the electronics and the light sensors in a processing component. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 4B are included on the LIDAR chip. In some instances, the components illustrated in the schematic of FIG. 4B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 from the same processing component as a second balanced detector 226. In particular, the first light sensor 223 and the second light sensor 224 are connected in series and the first auxiliary light sensor 218 and the second auxiliary light sensor 220 are connected in series. The serial connection in each of the first balanced detectors is in communication with a first data line 228 that carries the output from the first balanced detector as a first data signal. The serial connection in each of the second balanced detector is in communication with a second data line 232 that carries the output from the second balanced detector as a second data signal. The first data signals are each an electrical representation of a first composite signal and the second data signals are each an electrical representation of one of the second composite signals. Accordingly, each of the first data signals includes a contribution from a first waveform and a second waveform and the second data signal is a composite of the first waveform and the second waveform. The portion of the first waveform in a first data signal is phase-shifted relative to the portion of the first waveform in the second data signal but the portion of the second waveform in the first data signal is in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. Each of the first data signals and the second data signals are beating as a result of the beating between one of the comparative signals and the associated reference signal, i.e. the beating in the first composite signal and in the second composite signal.

Since a first data signal is an in-phase component and the associated second data signal its quadrature component, the first data signal and the associated second data signal together act as a complex data signal where the first data signal is the real component and the associated second data signal is the imaginary component of the input. The complex data signal is received at a LIDAR data generator 234 that processes the complex data signal so as to generate the LIDAR data (material indicator(s) and/or distance and/or radial velocity between the reflecting object and the LIDAR chip or LIDAR system).

Figure 4C:
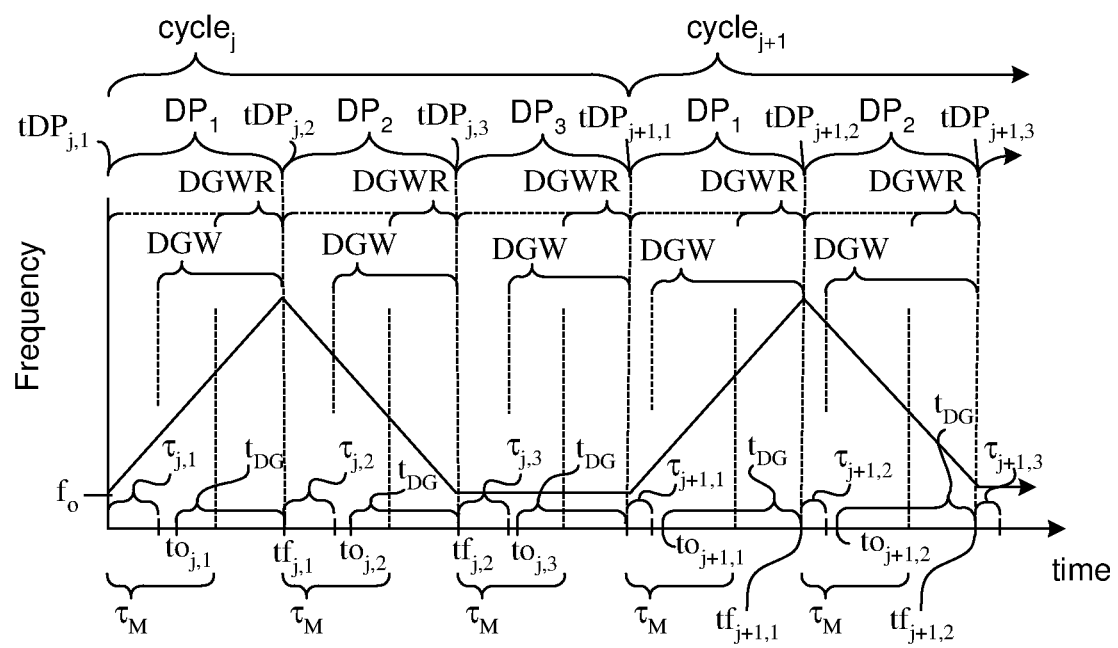
FIG. 4C is a graph illustrating a frequency versus time pattern for a LIDAR contribution to a system output signal.

During operation of the LIDAR system, the electronics operate the light source 7 so the LIDAR signal's contribution to the system output signal (the LIDAR signal contribution) is output in a series of cycles. FIG. 4C shows the frequency of the LIDAR signal contribution over time. The frequency of the LIDAR signal contribution is repeated in a series of cycles. FIG. 4C shows two cycles labeled cycle d and cycle $d_{j+1}$. FIG. 4C labels a base frequency of the LIDAR signal contribution $f_o$. The base frequency ($f_o$) can represent the lowest frequency of the LIDAR signal contribution during the cycles.

Each cycle can be associated with a sample region in a field of view. Accordingly, during a cycle, the LIDAR system outputs the system output signal that is used to generate the LIDAR data for the sample region that is illuminated by the system output signal during that cycle. When the system output signal is steered to different sample regions, different cycles can be associated with different sample regions. Accordingly, the LIDAR data generated from different cycles can be for different sample regions.

Each cycle includes K data periods that are each associated with a period index k and are labeled $DP_k$. In the example of FIG. 4C, each cycle includes three data periods labeled $DP_k$ with k=1, 2, and 3. Each data period starts at time $tDP_{j,k}$ where j represents the cycle index and k represents the period index. In some instances, the frequency versus time pattern is the same for the data periods that correspond to each other in different cycles as is shown in FIG. 4C. Corresponding data periods are data periods with the same period index. As a result, each data period $DP_1$ can be considered corresponding data periods and the associated frequency versus time patterns are the same in FIG. 4C.

During the data period $DP_1$, and the data period $DP_2$, the electronics operate the light source 7 such that the frequency of the LIDAR signal contribution changes at a linear rate α. The direction of the frequency change during the data period $DP_1$ is the opposite of the direction of the frequency change during the data period $DP_2$.

The delay time required for a system output signal to exit the LIDAR system, travel to a reflecting object, and to return to the LIDAR system is labeled $\tau_{j,k}$ in FIG. 4C where j represents the cycle index and k represents the period index. The delay time can vary in response to a change in distance between the LIDAR system and a reflecting object. As a result, different delay time $\tau_{j,k}$ values are evident in FIG. 4C.

The LIDAR system is typically configured to provide reliable LIDAR data at a maximum operational distance between the LIDAR system and the object. The time required for a system output signal to exit the LIDAR system, travel the maximum distance for which the LIDAR system is configured to provide reliable LIDAR data and to return to the LIDAR system is labeled $\tau_M$ in FIG. 4C.

Since there is a delay between the system output signal being transmitted and returning to the LIDAR system, the composite signals do not include a contribution from the LIDAR signal until after the system return signal has returned to the LIDAR system. Since the composite signal needs the contribution from the LIDAR signal for there to be a LIDAR beat frequency, the electronics measure the LIDAR beat frequency that results from system return signal that return to the LIDAR system during a data window in the data period.

The contribution from the LIDAR signal to the composite signals will be present at times larger than the maximum operational time delay ($\tau_M$). As a result, the data window can extend from the maximum operational time delay ($\tau_M$) to the end of the data period. When the object is close to the LIDAR system, the composite signals carry a contribution from the LIDAR signal early in the data period. As a result, the range of possible data windows can extend from the beginning of a data period to the end of the data period. FIG. 4C labels the full range of possible data windows in each data period as DGWR. As shown in FIG. 4C, the range of possible data windows has a static portion extending from the maximum operational time delay ($\tau_M$) to the end of the data period and a dynamic portion extending from the beginning of the data period to the maximum operational time delay ($\tau_M$).

The presence of the dynamic portion of the data window range allows the electronics to select the actual data window in response to the system return signal returning to the LIDAR system. For instance, the data windows can each start at or after the associated delay time ($\tau_{j,k}$) as is evident from the data windows labeled DGW in FIG. 4C and can extend to the end of the data period.

In some instances, there is a delay between the expiration of the delay time ($\tau_{j,k}$) and the start of a data window. For instance, examples of data windows are labeled $t_{DG}$ in FIG. 4C. Any delay between the expiration of the delay time ($\tau_{j,k}$) and the start of the data window can be a result of time require for the electronics to identify the return of the system return signal associated with expiration of the delay time ($\tau_{j,k}$) and/or can be programmed into the electronics. In some instance, the data windows ($t_{DG}$) are the same as the data windows labeled DGW in FIG. 4C and there is no delay between the expiration of the delay time ($\tau_{j,k}$) and the start of a data window.

As is evident from comparing the different data windows ($t_{DG}$) in FIG. 4C, the duration of the data windows ($t_{DG}$) can be variable between different data periods. The data windows ($t_{DG}$) can include a static portion extending from the maximum operational time delay (cm) to the end of the data window ($t_{DG}$) and a dynamic portion extending from the beginning of the data window ($t_{DG}$) to the maximum operational time delay ($\tau_M$). The variation in the duration of the data windows ($t_{DG}$) can result from the duration of the dynamic portion of the data window being different in different data periods while the duration of the static portion of the data windows remains the same in different data periods.

The reliability of the LIDAR data increases as the duration of the actual data windows ($t_{DG}$) increases. The ability to adjust the data window in response to the return of the system return signal allows the duration of the data windows ($t_{DG}$) to be increased and accordingly increases the reliability of the LIDAR.

Each of the data windows ($t_{DG}$) in FIG. 4C extends from a window opening time labeled to$_{j,k}$ to a window closing time labeled tf$_{j,k}$ where j represents the cycle index and k represents the period index. Although the window closing times (tf$_{j,k}$) are shown as being the same as the end of the data period, the window closing times (tf$_{j,k}$) need not be the same as the end of the data periods. Accordingly, the data windows ($t_{DG}$) can close before the end of the data periods. In some instances, the data windows ($t_{DG}$) have a duration that is greater than or equal to 60%, or 80% of the time between the delay time ($\tau_{j,k}$) and the end of the data period.

Figure 4D:
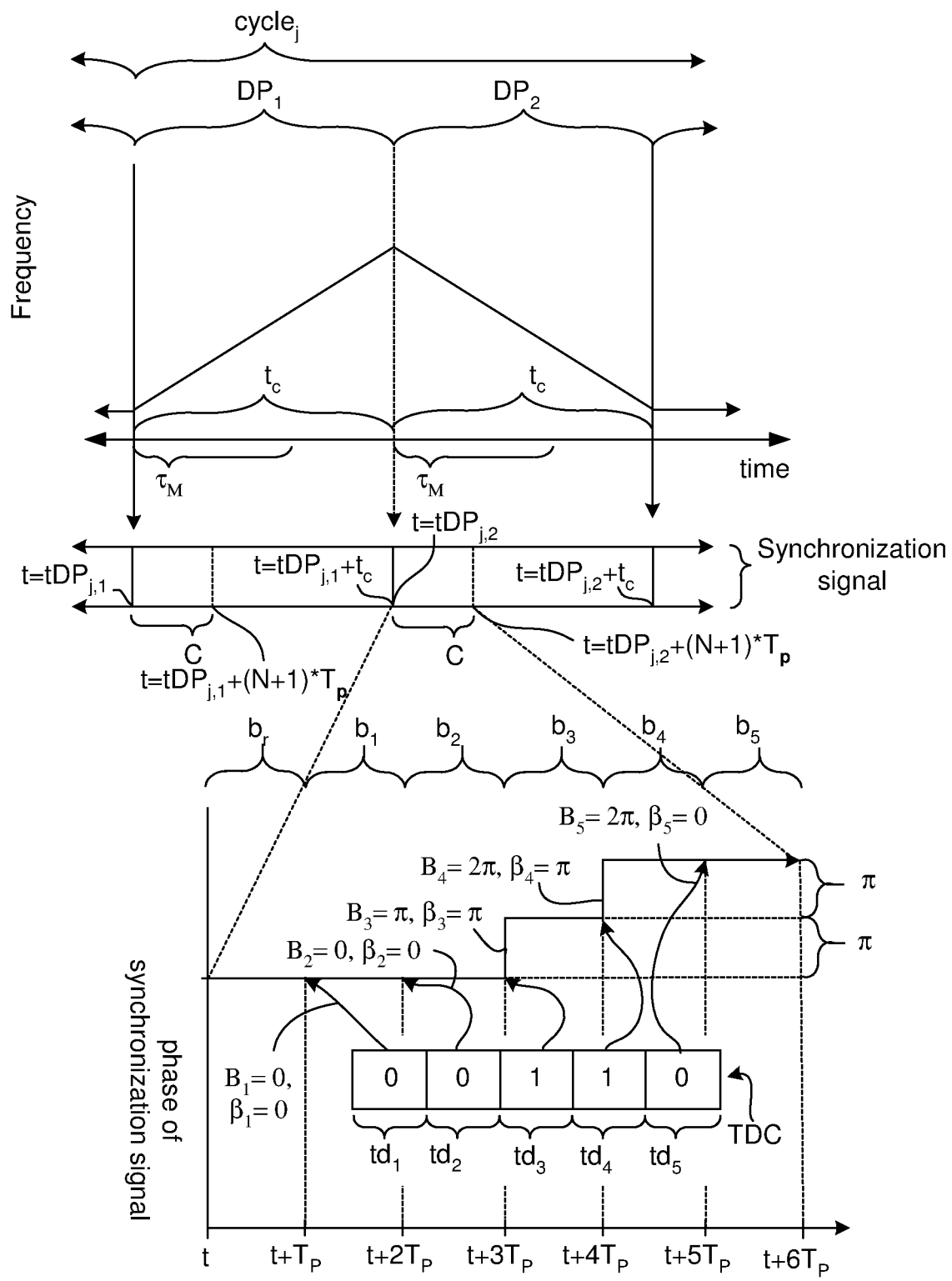
FIG. 4D compares a synchronization signal to a portion of the frequency versus time graph of FIG. 4C.

FIG. 4D compares a synchronization signal to a portion of the frequency versus time graph of FIG. 4C. The synchronization signal and the graph are both shown relative to the same time axis. During a code portion of each data period (labeled C), the synchronization signal carries a binary code. As a result, the synchronization signal contribution to the system output signal carries the binary code.

The code portion of each data period is illustrated as being divided into N+1 bits. In FIG. 4D, the code portion of each cycle is illustrated as having 6 bits (N=5) for the purpose of simplifying the illustration and the following discussion.

The bits in the code portion of each data period are each labeled $b_r$ or $b_n$ where n represents a bit index that is an integer. For the purposes of simplicity, the bit indices (n) illustrated in FIG. 4D have values of 1 through 5. The bit index can be assigned relative to time. For instance, a lower bit index is output from the LIDAR system before a bit with a higher bit index. The bit with bit index one ($b_1$) can be the first bit carried by the system output signal at the start of the code portion of the cycle.

Each code portion bit has a duration labeled $T_p$. The transmission of the code portion of the system output signal for data period k in cycle j can start at t=tDP$_{j,k}$ and end at t=tDP$_{j,k}$+(N+1)*$T_p$.

The duration of each data period can be represented by $t_{DP}$. The value of ter can be selected such that $t_{DP} \geq (N+1)*T_p$ to allow the code portion of the system output signal time to return to the LIDAR system before the start of the data period when the reflecting object is positioned at the maximum distance for which the LIDAR system is configured to provide reliable results.

In some instances, ter (N+1)*$T_p$. As a result, the code portion can be transmitted for the full duration of the data period. When code portion is transmitted for the full duration of the data period, the intensity modulator 12 need not be present in the LIDAR system.

In some instances, the electronics can operate the intensity modulator 12 so the transmission of the synchronization signal contribution to the system output signal is stopped between the time t=tDP$_{j,k}$+(N+1)*$T_p$ and time t=tDP$_{j,k}$+$t_{DP}$. Alternately, (N+1)*$T_p$ can be selected so the code portion is equal to $t_{DP}$. Accordingly, the synchronization signal contribution to the system output signal can carry the code portion for the entire duration of the data period.

In some instances, the bit durations ($T_p$) is $\leq 2*R/c$ where c represents the speed of light and R represents a range resolution that can be the min distinguishable distance between 2 adjacent targets. The range resolution (R) can be application specific. In some instances, the bit durations ($T_p$) are less than 10 ns, 5 ns, or ln and can be as low as ns. The number of bits for the code portion of the synchronization signal contribution to the system output signal can be represented by N where N=$t_{DP}/T_p$ and $t_{DP} \geq \tau_M$. In some instances, N is greater than 300, or 1000 and/or is less than 3000 or 10000. In an example where the maximum range is 200 m, N>1300.

During each data period, the electronics operate the components of the LIDAR system such that the synchronization signal is encoded with a binary code during the code portion of the data period. For instance, when a light system 2 includes the illustrated synchronization light source 5 and phase modulator 11, the electronics can operate the phase modulator 11 such that the synchronization signal is encoded with the binary code during the code portion of the data period. Examples of a suitable binary code include, but are not limited to, m-sequence.

FIG. 4D includes an example of a binary code labeled TDC. The binary code is divided into N bits. Each of the N bits carries a digit from the binary code. The illustrated binary code includes N=5 bits and consists of 0s and 1s. For instance, the code illustrated in FIG. 4C is represented by 0, 1, 1, 0, 0. Equivalent versions of the code can also be used. For instance, a bi-polar version of a binary code uses only the digits 1 and −1. An example of an equivalent bi-polar representation of the binary code 0, 1, 1, 0, 0 can be 1, −1, −1, 1, 1.

The binary code is selected to have good autocorrelation properties. A code can be multiplied by a copy of the code to produce a numerical alignment indicator (autocorrelation value). The copy of the code can be a direct copy of the code or a different version of the code. When multiplying a code by the copy, the copy can be shifted relative to the code or can be unshifted relative to the code. When the copy is shifted relative to the code, the shift can be by one or more bits. When multiplying the code and the copy, each bit in the code is associated with one of the bits in the copy. When the copy is unshifted relative to the code, each bit from the code is associated with itself in the copy and the copy and the code are considered to be aligned. The shifting of the copy relative to the code changes the bits from the copy that are associated with the bits from the code.

During multiplication of the code and the copy, each bit from the code is multiplied by the associated bit in the copy and the results from each bit multiplication are added to provide the alignment indicator. The alignment indicator can be generated for multiple different shifts of copy relative including a shift of zero bits (alignment). As a result, a function indicating a value of the alignment indicator versus the number of bits for the shift can be generated. The sequence of digits in autocorrelated codes are selected such that the value of the alignment indicator peaks when the code and copy are aligned but is constant or substantially constant at lower values when the code and copy are not aligned. Examples of suitable codes are the codes that have been developed for wireless systems and exist in mature standards such as the global third generation (3G) wideband code division multiple access (CDMA) standards.

In some instances, the code is selected such that when the alignment indicator values are normalized to have a value from 0 to 1 with the alignment indicator at alignment having a value of 1, and when the copy is shifted away from alignment with the code in either or both directions by a number of bits called the shift number, the value of the alignment indicator is less than 0.1, or 0.05. The shift number can be greater than or equal to 1, 2, or 3. In some instances, this condition is maintained for each non-zero shift number in the code. In some instances, the value of the alignment indicator is less than 0.1 or 0.05 for each shift number greater than or equal to 1, 2, or 3 and/or less than 150 or 3000 when the copy is shifted by the shift number in one direction or both directions.

When a light system 2 includes the illustrated synchronization light source 5 and phase modulator 11, the electronics can operate the phase modulator 11 such that the code is carried in the phase of the synchronization signal. For instance, the phase of synchronization signal can be differential phase shifted according to the code using phase shift keying (PSK). In an example of differential phase shifting, the phase of the synchronization signal is changed by a first phase shift when the synchronization signal is to show a first digit of the binary code and is changed by a second phase shift when the synchronization signal is to show a second digit of the binary code. The amount of the first phase shift or the second phase shift can be zero degrees.

As an example, FIG. 4D illustrates the bits in the code portion of the synchronization signal encoded by differential phase shifting to carry the binary code labeled TDC. Encoding by differential phase shifting carries data at the interface between adjacent bits. There may not be a bit before the code portion bit $b_1$. As a result, a reference bit labeled $b_r$ is added to the bits in the code portion of the synchronization signal. The reference bit ($b_r$) can have a set value that is not a function of the digits in the binary code. In FIG. 4C, the reference bit labeled $b_r$ carries a value of 0 but it could carry a value of $\pi$.

To apply a differential phase shift scheme to the binary code illustrated in FIG. 4D, the first digit can be 0 and the second digit can be 1. The first phase shift can be 0 rad and the second phase shift can be $\pi$ rad. As a result, the phase of the synchronization signal can be changed by 0 rad when the synchronization signal contribution to the system output signal is to show a 0 and is changed by $\pi$ rad when the synchronization signal contribution to the system output signal is to show a 1. An example of how the differential phase shift scheme is applied to a binary code is provided in FIG. 4D. FIG. 4D includes a graph showing the phase of the synchronization signal contribution to the system output signal as function of time. The values of the first phase shift and the second phase shift are represented by an encoded phase shift labeled $\beta_n$ where n represents the bit index. Accordingly, $\beta_n$ can have a value of 0 (first phase shift) or $\pi$ (second phase shift). The variable labeled $B_n$ in FIG. 4D represents the cumulative value of the $\beta_n$ values up to bit index n. The binary code labeled TDC is placed on the graph to show how values in the slots of the binary code translate to the $\beta_n$ values.

The binary code slot labeled $td_1$ has a value of 0. As a result, the transition from bit $b_r$ to bit $b_1$ shows an encoded phase shift ($\beta_1$) of 0 radians. The binary code slot labeled $td_2$ has a value of 0. As a result, the transition from bit $b_1$ to bit $b_2$ shows an encoded phase shift ($\beta_2$) of 0 radians. The binary code slot labeled $td_3$ has a value of 1. As a result, the transition from bit $b_2$ to bit $b_3$ shows an encoded phase shift ($\beta_3$) of $\pi$ radians. The binary code slot labeled $td_4$ has a value of 1. As a result, the transition from bit $b_3$ to bit $b_4$ shows an encoded phase shift ($\beta_4$) of $\pi$ radians. The binary code slot labeled $td_5$ has a value of 0. As a result, the transition from bit $b_4$ to bit $b_5$ shows an encoded phase shift ($\beta_5$) of 0 radians.

Figure 4E:
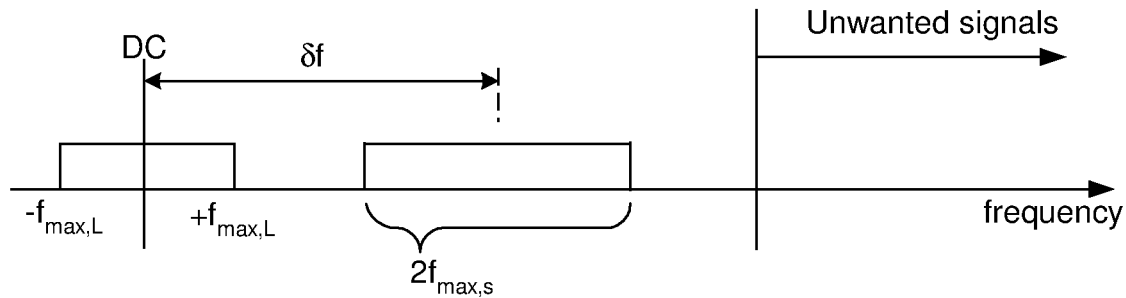
FIG. 4E illustrates the frequency bands for a composite signal that includes contributions from a LIDAR signal, LIDAR reference signal, synchronization signal, and a synchronization reference signal.

When the synchronization signal and the synchronization reference signal are continuous wave signals and the LIDAR system is operated as disclosed in the context of FIG. 4C through FIG. 4D, the frequencies that can be present in the first data signal and the second data signal are illustrated in FIG. 4E. The beat frequency between the LIDAR signal and the LIDAR reference signal is in a LIDAR signal band centered at DC and extending from $-f_{max,L}$ to $+f_{max,L}$ where $f_{max,L}=(\alpha^*\tau_M+|f_{dmax,L}|)$ where $f_{dmax,L}$ represents the maximum value of the Doppler frequency shift in the system output signal for which the LIDAR system is configured to operate. The beat frequency between the synchronization signal and the synchronization reference signal is in a synchronization signal band centered at (DC+$\delta f$) and extending from (DC+$\delta f-f_{max,s}$) to (DC+$\delta f+f_{max,s}$) where $f_{max,s}=(1/T_p+|f_{dmax,s}|)$ where $f_{dmax,s}$ represents the maximum value of the Doppler frequency shift in the synchronization signal for which the LIDAR system is configured to operate.

The location of the LIDAR signal band and the synchronization signal band can be a function of a variable $\delta f$ where $\delta f$ represents the frequency separation between the center of the synchronization signal band and the center of the LIDAR signal band. Overlap between the synchronization signal band and the LIDAR signal band can be avoided by selecting $\delta f$ such that $\delta f > 2^* \max(f_{max,L}, f_{max,s})$.

As shown in FIG. 4E, unwanted frequencies may be present in the first data signal and the second data signal. The location of the unwanted frequencies is related to the value of $\Delta f$ where $\Delta f=f_{r,s}-f_o$ where $f_{r,s}$ represents the frequency of the synchronization reference signal and $f_o$ represents the base frequency disclose in the context of FIG. 4C. The value of $\Delta f$ can be such that $\Delta f > (3\delta f + \alpha^* t_{DP})$ to separate the unwanted frequencies from the desired frequencies by moving the unwanted frequencies to frequencies above the synchronization signal band and the LIDAR signal band; where α represents the rate of change (chirp rate) to the LIDAR signal contribution as disclosed above and ter represents the duration of the data period.

Figure 4F:
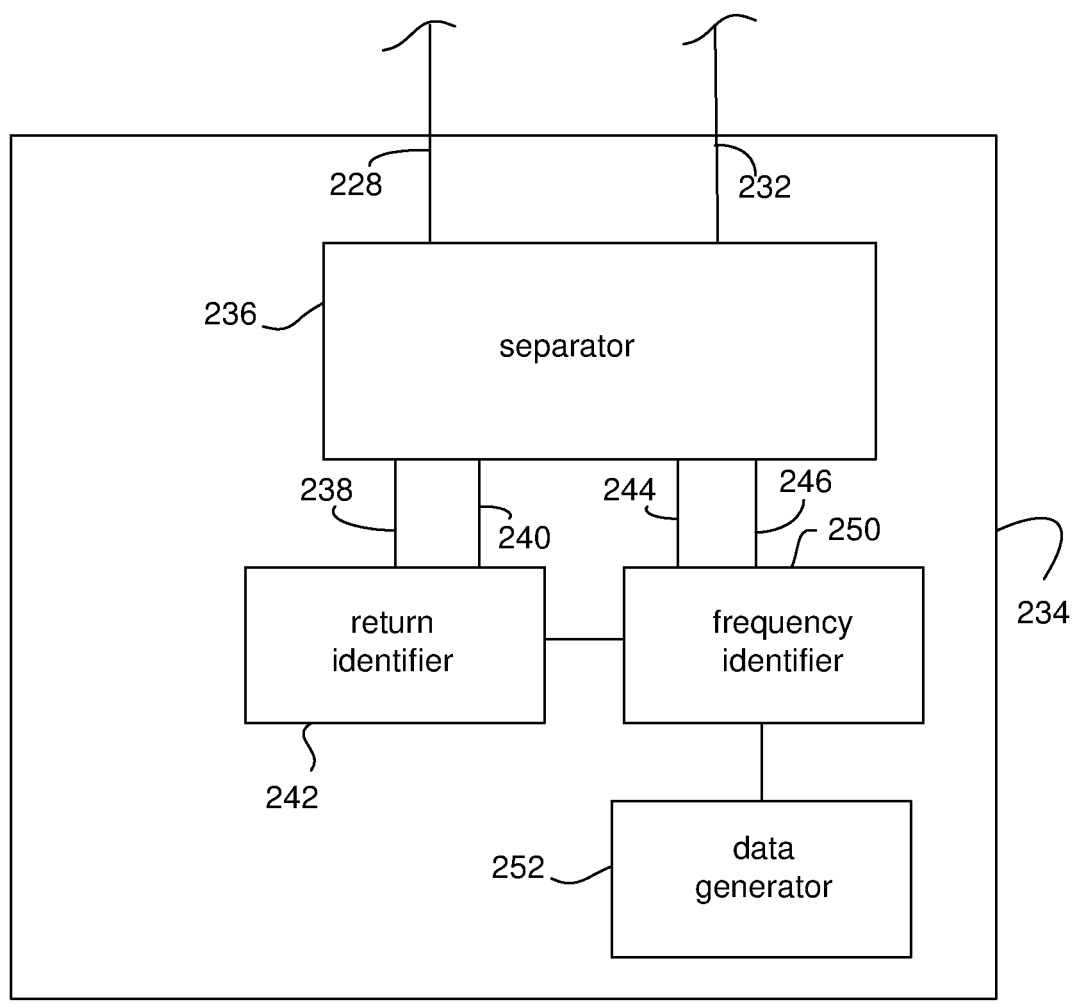
FIG. 4F is a block diagram of an example of a suitable LIDAR data generator for use with the processing unit of FIG. 4A.

FIG. 4F is a block diagram of an example of a suitable LIDAR data generator 234. The LIDAR data generator 234 includes a separator 236 that receives the first data signal from the first data line 228 and the second data signal from the second data line 232. The first data signal and the second data signal each carries a LIDAR signal contribution, the LIDAR reference signal contribution, synchronization signal contribution, and a synchronization reference signal contribution. The separator 236 is configured to separate the LIDAR signal contribution and the LIDAR signal reference contribution carried in the first data signal from the LIDAR signal contribution and the LIDAR signal reference contribution carried in the first data signal. The separator 236 is also configured to separate the LIDAR signal contribution and the LIDAR reference signal contribution carried in the second data signal from the LIDAR signal contribution and the LIDAR signal reference contribution carried in the second data signal.

The separator 236 outputs the synchronization signal contribution and the synchronization reference signal contribution extracted from the first data signal on a first synchronization line 238 as a first separated synchronization signal. The separator 236 outputs the synchronization signal contribution and the synchronization reference signal contribution extracted from the second data signal on a second synchronization line 240 as a second separated synchronization signal. The first separated synchronization signal and the second separated synchronization signal act together as a complex separated synchronization signal.

The complex separated synchronization signal is received at a return identifier 242. The return identifier processes the complex separated synchronization signal so as to identify the delay time ($\tau_{j,k}$ in FIG. 4C). The return identifier 242 outputs a return identification signal that indicates the delay time ($\tau_{j,k}$).

The separator 236 outputs the contribution and the LIDAR signal reference contribution carried extracted from the first data signal on a first LIDAR line 244 as a first separated LIDAR signal. The separator outputs the contribution and the LIDAR signal reference contribution extracted from the second data signal on a second LIDAR line 246 as a second separated signal. The first separated LIDAR signal and the second separated LIDAR signal act together as a complex separated LIDAR signal.

The complex separated LIDAR signal and the return identification signal are received at a frequency identifier 250. The frequency identifier 250 uses the delay time ($\tau_{j,k}$) to identify the data window (labeled $t_{DG}$ in FIG. 4C). The frequency identifier 250 uses the portion of the complex separated LIDAR signal that is generated from system return signals that return to the LIDAR system within the selected data window to identify the LIDAR beat frequency. The frequency identifier 250 outputs a frequency signal that indicates the identified beat frequency.

The frequency signal is received at a data generator 252 that uses the identified frequency to generate the LIDAR data for an object that reflected the system return signals. As a result, the LIDAR data is generated from system return signals that return to the LIDAR system during the data window but system return signals that return to the LIDAR system outside the data window are not and/or need not be used in the generation of the LIDAR data.

Figure 4G:
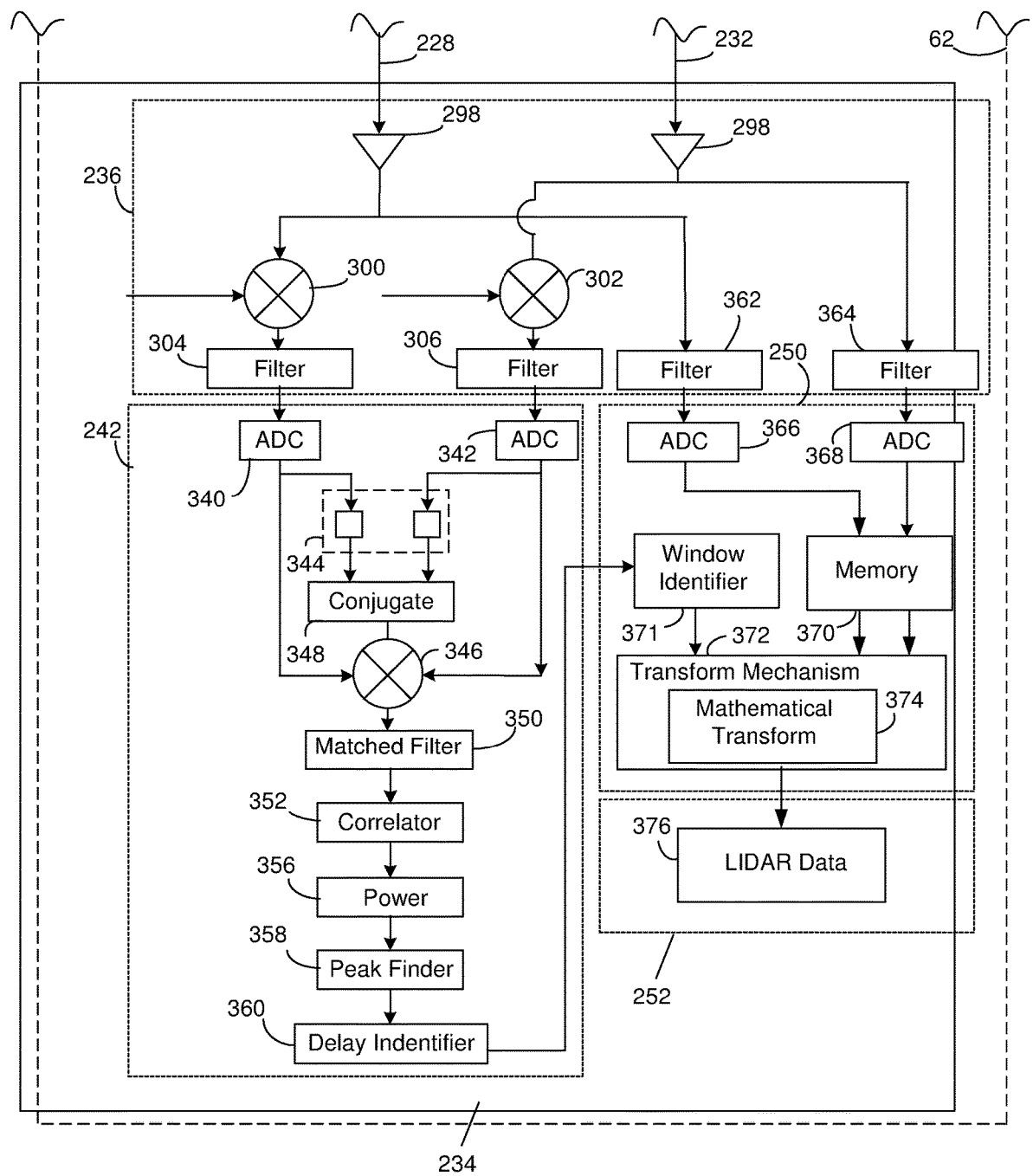
FIG. 4G is a schematic of an example LIDAR data generator suitable for use as the LIDAR data generator of FIG. 4F.

FIG. 4G is a schematic of an example LIDAR data generator 234 suitable for use as the LIDAR data generator 234 of FIG. 4F. The LIDAR data generator 234 includes a separator 236 that receives the first data signal from the first data line 228 and the second data signal from the second data line 232. The LIDAR data generator 234 optionally includes amplifiers 298 configured to amplify the first data signal and the second data signal.

The separator 236 includes a first multiplier 300 that receives the first data signal and a second multiplier 302 receives the second data signal. As evident from FIG. 4E, the synchronization signal band is centered at (DC+δf). As a result, the first multiplier 300 is configured to downconvert the first data signal from (DC+δf) such that the synchronization signal band is centered at DC. Additionally, the second multiplier 302 is configured to downconvert the second data signal from (DC+δf) such that the synchronization signal band is centered at DC. The first multiplier 300 outputs the converted first data signal and the converted second data signal.

The separator 236 includes a first filter 304 that receives the converted first data signal. The first filter 304 is selected to filter out the LIDAR signal contribution, the LIDAR reference signal contribution, and the undesired higher frequency components discussed in the context of FIG. 4F. As a result, the first filter 304 passes the synchronization signal contribution and the synchronization reference signal contribution in a first filtered signal.

The separator 236 also includes a second filter 306 that receives the converted second data signal. The second filter 306 is selected to filter out the LIDAR signal contribution, the LIDAR reference signal contribution, and the undesired higher frequency components discussed in the context of FIG. 4F. As a result, the second filter 306 passes the synchronization signal contribution and the synchronization reference signal contribution in a second filtered signal. The first filtered signal and the second filtered signal together serve as a complex filtered signal. The complex filtered signal is received at the return identifier 242. Suitable first filters 304 and/or second filters 306 includes, but are not limited to, lowpass filters, and filter pairs with matching responses.

The return identifier 242 includes a first Analog-to-Digital Converter (ADC) 340 that receives the first filtered signal and converts the first filtered signal from an analog form to a digital form and outputs a first digital data signal. The return identifier 242 includes a second Analog-to-Digital Converter (ADC) 342 that receives the second filtered signal and converts the second synchronization contribution signal from an analog form to a digital form and outputs a second digital data signal. To generate a digital form of the complex filtered signal, the first Analog-to-Digital Converter (ADC) 340 and the second Analog-to-Digital Converter (ADC) 342 each periodically samples one of the filtered signals. As a result, the first digital data signal and the second digital data signal each carries a series of ADC samples of one of the filtered signals. As described above, the system output signal carries multiple bits of a code. As a result, the synchronization signal contribution to the system return signal and the filtered signals each carry multiple bits. The sampling rate of the first Analog-to-Digital Converter (ADC) 340 and the second Analog-to-Digital Converter (ADC) 342 can be selected such that each bit in each of the filtered signals is sampled multiple times. Accordingly, the first digital data signal and the second digital data signal each carries multiple ADC samples from each bit of one of the filtered signals.

The first digital data signal is received at a delay 344 and a multiplier 346. The second digital data signal is also received at the delay 344 and the multiplier 346. The delay 344 delays the first digital data signal by a delay period and outputs a delayed first digital data signal. The delay 344 delays the second digital data signal by the delay period and outputs a delayed second digital data signal. The amount of the delay period can be equal to or substantially equal to the bit duration $T_p$.

The delayed first digital data signal and the delayed second digital data signal are received at a conjugator 348. The conjugator 348 generates the conjugate of the complex signal resulting from the delayed first digital data signal and delayed second digital data signal. As a result, the conjugator 348 outputs a conjugate signal that carries the conjugate of the complex signal represented by the delayed first digital data signal and delayed second digital data signal.

The multiplier 346 receives the conjugate signal and multiplies the conjugate signal by the complex signal carried by the combination of the first digital data signal and the second digital data signal. Since the conjugate signal is generated from delayed signals but the digital data signal and the second digital data signal are not delayed, the multiplier multiplies a delayed signal by a non-delayed signal. Since the amount of delay can be equal to the bit duration ($T_p$), the delayed signal and the non-delayed signal are from adjacent bits. The multiplier outputs a code signal that carries a scaled and phase-rotated version of the code.

The code signal is received at a matched filter 350 configured to convert the code signal from a square form to a triangular form. The matched filter 350 is matched to the system output signal. For instance, the matched filter 350 can convolve the code signal with a matched filter impulse response that is a square wave matched to the code signal.

A correlator 352 receives the convolved code signal from the matched filter 350. The correlator 352 multiples the binary code or an equivalent version of the binary code by the convolved code signal so as to generate an alignment indicator as described above. The alignment indicator is generated for multiple shifts of the convolved code signal to generate data indicating the value of the alignment indicator versus the degree of shifting between the binary code or an equivalent version of the binary code and the convolved code signal, i.e. versus the number of bits for the shift. The correlator outputs a correlation signal indicating the value of the alignment indicator versus the degree of shifting. As will become evident below, the alignment indicator can be a complex number.

The correlation signal is received by a power component 356 that generates a power signal that indicates a power level of the correlation signal versus the degree of shifting. For instance, the power component can calculate the value of $Re^2+Im^2$ from the alignment indicator where Re represents the real component of the alignment indicator and Im represents the imaginary component of the alignment indicator.

The power signal is received at a peak finder 358 that identifies a peak in the power signal that is a result of a system output signal being reflected by an object located outside of the LIDAR system. The output of the peak finder 358 is received at a delay identifier 360 that uses the identified peak to determine the delay time ($\tau_{j,k}$).

Figure 4H:
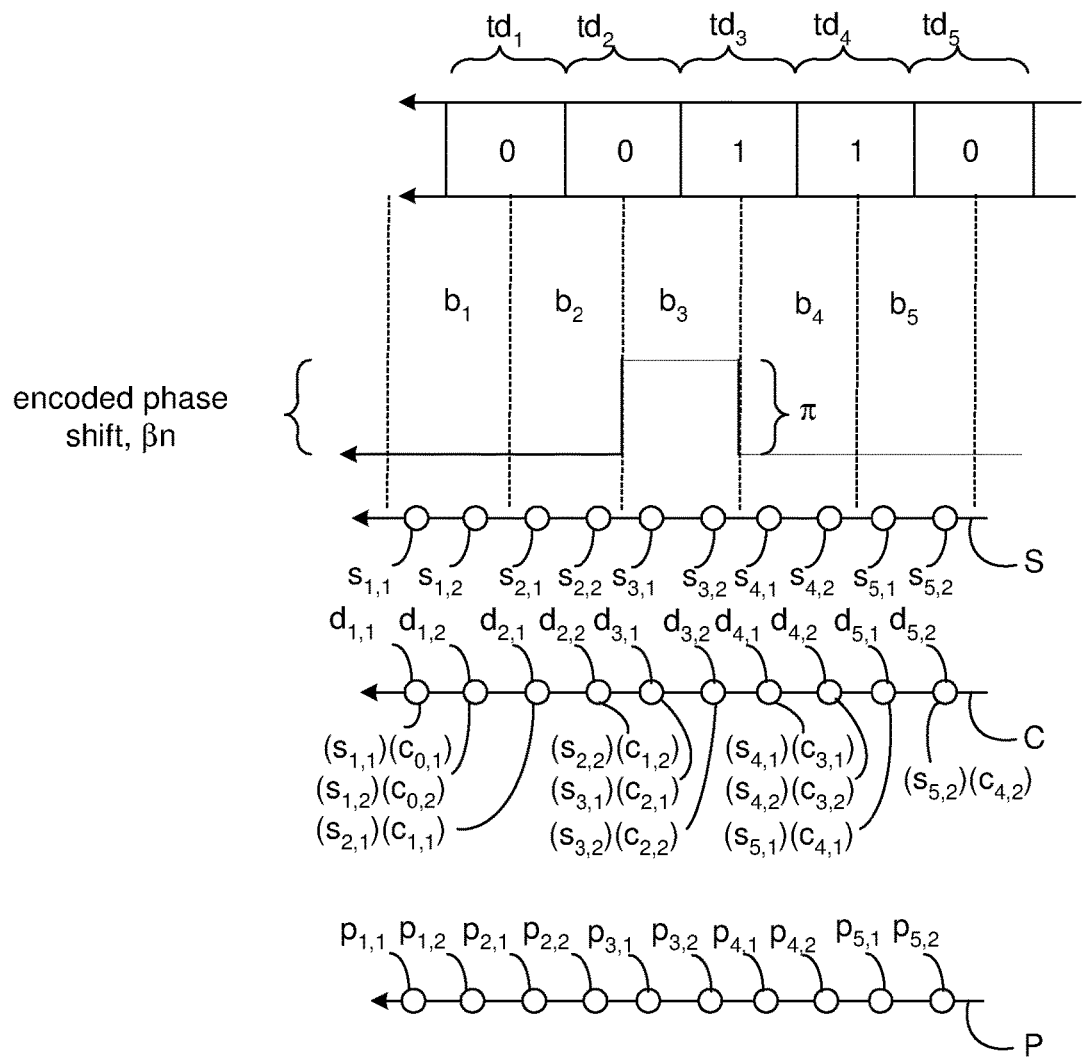
FIG. 4H illustrates the relationship between the bits of a binary code and signals that are processed by the LIDAR data generator.

As noted above, the synchronization signal contribution to the system output signal carries data from a code arranged in a series of bits. As a result, the contribution of the synchronization signal to the system return signal and the resulting complex filtered signal also carries this code arranged in the same series of bits. FIG. 4H includes an arrow labeled S that illustrates the complex filtered signal. To illustrate the portions the complex filtered signal that are associated with different bits, the code and phase versus bit pattern from FIG. 4D are copied into FIG. 4H. Each of the different bits is labeled $b_1$ through $b_5$ and is positioned over the portion of the complex filtered signal that carries the data from that bit. As discussed above, the illustrated bits are associated with the encoded phase shifts.

In FIG. 4H, the times where the first Analog-to-Digital Converter (ADC) 340 and the second Analog-to-Digital Converter (ADC) 342 sample the complex filtered signal are illustrated by the circles labeled $s_{n,k}$ where n is the bit index and k is an ADC sample index. The number of ADC samples per bit can be represented by M. In the illustrated example, the bits are sampled at a rate of twice per bit (M=2). The ADC samples are arranged in the complex filtered signal (labeled S) such that as time increases, the value of the bit index (n) stays constant while the value of the ADC sample index (k) increases from 1 to M. After the value of the ADC sample index (k) reaches M, the value of the bit index is increased by 1, the ADC sample index (k) is re-set to one and the sequence repeated.

The electronics can operate one or more optical components so as to provide the synchronization reference signal and the synchronization signal with the desired characteristics. For instance, the electronics can operate one or more components selected from a group consisting of the light system 2, phase modulator 11, and intensity modulator 12 such that the synchronization reference signal can be represented by $S_{ref}(t)=\cos(2\pi f_{rs}t)$ and the synchronization signal can be represented by $S_{tx}(t)=\cos(2\pi f_s t+B_n)$ where $f_{rs}$ represents the frequency of the synchronization reference signal and $f_s$ represents the frequency of the synchronization signal and $B_n$ represents the cumulative encoded phase shift for the bit with bit index n as disclosed in the context of FIG. 4C. The synchronization reference signal is not encoded with the binary code while the synchronization signal carries the binary code as is evident from the presence of the term $B_n$ in $S_{tx}(t)$.

When the synchronization reference signal and the synchronization signal are represented by $S_{ref}(t)$ and $S_{tx}(t)$ as described above, each ADC sample carried by the first digital data signal and the second digital data signal can be represented by $s_{n,k}=Ae^{j\phi_n}$ where A represents the amplitude and the j indicates a complex value (i.e. sqrt(−1)) and n represents the bit index. As a result, the ADC sample can also be represented by $A(\cos(\phi_n)+j*\sin(\phi_n))$. The variable $\phi_n$ represents the phase during the ADC sample with bit n and can be determined from $\phi_n=\theta_0+\omega_d*t+n*\omega_d*T_p+B_n$ where $\theta_0$ is a constant that can be zero, t represents time, cod is the Doppler frequency, n is bit index, $T_p$ represents the bit duration.

During the conjugation and multiplication performed by the multiplier 346 and conjugator 348, the code signal can be generated by multiplying the ADC sample $s_{n,k}$ by $c_{n-1,k}$, where $c_{n-1,k}$ represents the conjugate of the ADC sample $s_{n-1,k}$. As a result, the code signal can be represented by a series of CS samples represented by $d_{n,k}=A^2 e^{j\omega d*Tp}e^{j\beta n}$ where $\beta_n$ has a value of 0 radians or $\pi$ radians that can change in response to changes in the bit index n as discussed in the context of FIG. 4C. The code signal is labeled C in FIG. 4H. The circles on the code signal are each vertically aligned with a circle on the complex filtered signal. The vertically aligned circles correspond to the same ADC sample. The CS samples are arranged in the complex filtered signal (labeled S) such that as time increases, the value of the bit index (n) stays constant while the value of the value of the ADC sample index (k) increases from 1 to M. After the value of the ADC sample index (k) reaches M, the value of the bit index is increased by 1, the ADC sample index (k) is re-set to one and the sequence repeated.

The multiplication of the ADC sample by the conjugate of a previous ADC sample removes the $\omega_d*t$ term that was present in phase ($\phi_n$) of the ADC samples ($s_{n,k}=Ae^{j\phi_n}$) from the CS samples ($d_{n,k}=A^2 e^{j\omega d*Tp}e^{j\beta n}$) where cod represent a Doppler shift that induces sinusoids in the ADC as a result of LIDAR echoes. The use of differential phase keying combined with this multiplication removes this sine wave from the below LIDAR data solutions.

The matched filter receives the code signal and outputs the convolved code signal labeled P in FIG. 4F. Circles on the convolved code signal are each vertically aligned with a circle on the complex filtered signal. The circles on the code signal are each vertically aligned with a circle on the complex filtered signal. The vertically aligned circles correspond to the same ADC sample.

The matched filter is configured to convert the convolved code signal from a square form to a triangular form that is output from the matched filter as the convolved code signal. The convolved code signal (CCS) can carry a series of CCS samples represented by $p_{n,k}$ where n is the bit index and k is a sample index. The CCS samples are arranged in the convolved code signal (labeled P) such that as time increases, the value of the bit index (n) stays constant while the value of the value of the ADC sample index (k) increases from 1 to M. After the value of the ADC sample index (k) reaches M, the value of the bit index is increased by 1, the ADC sample index (k) is re-set to one and the sequence repeated.

Each $p_{n,k}$ is associated with one of the ADC samples. The value of CCS sample $p_{n,k}$ can be generated by convolving the code signal and the matched filter impulse response. In some instances, the filter impulse response is a square wave matched to the bit shape or pulse shape of the code signal. The code signal can be convolved with the matched filter impulse response to produce 2M-1 different convolution values for each of the bits. Each of the different convolution values can be labeled $v_{n,m}$ where n represents the bit index and m is an integer with a value is from 1 to 2M-1. The different convolution values can be generated by identifying the portion of the code signal associated with the CCS samples in the same bit. Below, the identified portion of the code signal is called the common bit portion. For instance, the CS samples $d_{2,1}$ and $d_{2,2}$ are associated with the same bit having bit index n=2. As a result, CS samples $d_{2,1}$ and $d_{2,2}$ represent a common bit portion of the code signal.

The common bit portion can be multiplied by the filter impulse response. For instance, the filter impulse can be a signal having a series of M samples represented by $f_q$ where q is an index for the filter impulse response index and extends from 1 to M. The different convolution values ($v_{n,m}$) for a single bit with value n can result from shifting the filter impulse response different degrees relative to the common bit portion and calculating the convolution value $v_{n,m}$ for each degree of shift. The shift can be by one or more CS samples and is done such that at least one CS sample in the common bit portion is associated with one of the filter impulse responses. The shifting of the filter impulse response relative to the common bit portion changes the samples from the filter impulse response that are associated with the CS samples from the common bit portion.

During multiplication of the code and the filter impulse response, each CS sample from the common bit portion is multiplied by the associated sample from the filter impulse response and the results from each bit multiplication are added to provide the convolution values ($v_{n,m}$). When a CS sample from the common bit portion is not associated with a sample from the filter impulse response, the unassociated CS sample is multiplied by 0. When a sample from the filter impulse response is not associated with a CS sample from the common bit portion, the unassociated sample from the filter impulse response is multiplied by 0.

Each convolution value ($v_{n,m}$) is associated with one of the ADC samples. For instance, convolution value $v_{n,m}$ can be associated with ADC sample $s_{n,m}$. However, there are M-1 more convolution values than there are ADC samples associated with a bit, i.e. 2M-1 is greater than M. For convolution values with m>M, the convolution value ($v_{n,m}$) is associated with ADC sample ($s_{n+1,m-M}$). As a result, convolution values ($v_{n,m}$) from different bits can be associated with the same ADC sample. The convolution values associated with the same ADC sample are added together to get the value of the CCS sample $p_{n,k}$ associated with that ADC sample. When a single convolution value ($v_{n,m}$) is associated with an ADC sample, that convolution value serves as the value of the CCS sample ($p_{n,k}$) associated with that ADC sample.

FIG. 4I illustrates an example convolution. The example shows two ADC samples per bit, i.e. M=2. Accordingly, there are 2M-1=3 convolution values per bit and two filter impulse response samples represented by $f_1$ and $f_2$. The convolution values for bit n=1 and n=2 are shown and a portion of the convolution values for n=0 and n=3 are shown. Since the convolution values $v_{1,3}$ and $v_{2,1}$ are associated with the same ADC sample $p_{2,1}$; the values of $v_{1,3}$ and $v_{2,1}$ are added to determine that $p_{2,1}=v_{1,3}+v_{2,1}$.

The convolved code signal is received by the correlator 352. The correlator includes a first tapped delay line 300. The first tapped delay line 300 includes delay cells 302 that each receives one of the CCS samples ($p_{n,k}$). The correlator includes a second tapped delay line 304. The second tapped delay line 304 includes second delay cells 306 that each receives one of the CCS samples ($p_{n,k}$) from the first tapped delay line 300. The CCS samples ($p_{n,k}$) that the second delay cells 306 receive from the first tapped delay line 300 are separated by M-1 delay cells 302. For instance, the above illustration uses M=2 ADC samples per bit. As a result, the CCS samples ($p_{n,k}$) provided to the second tapped delay line 304 are separated by one delay cell.

Figure 4J:
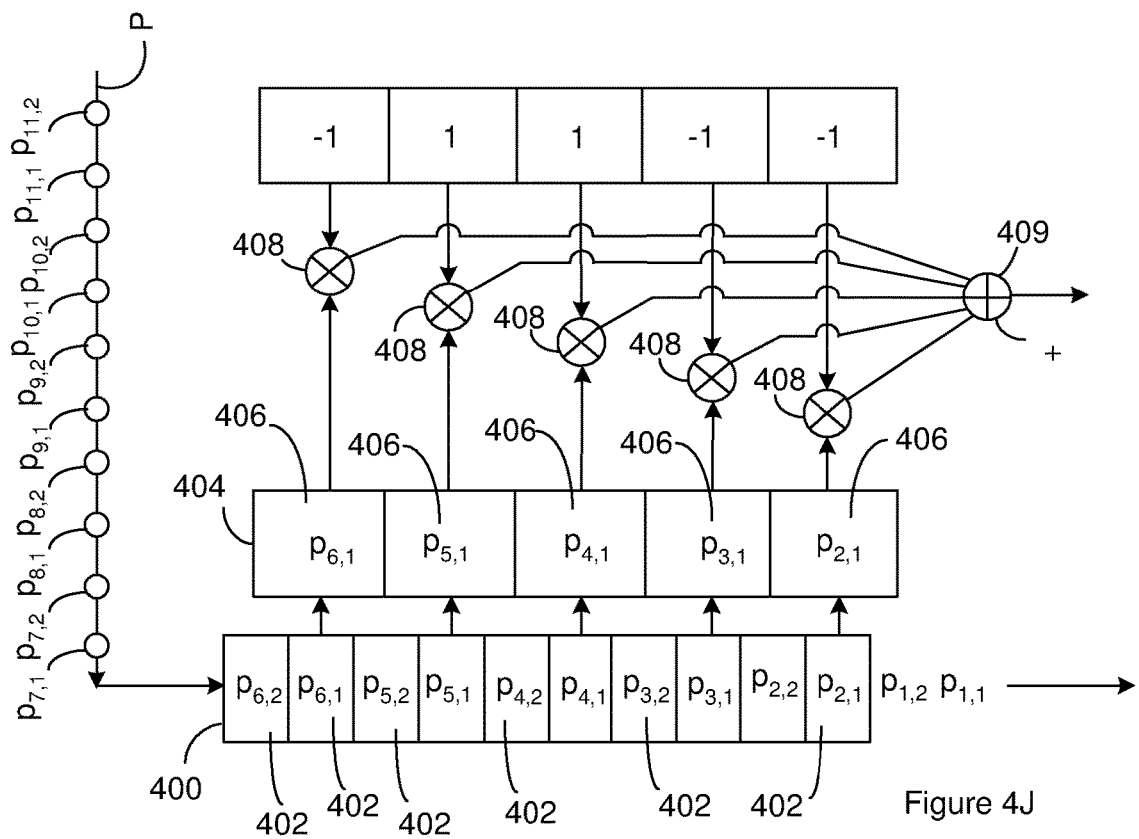
FIG. 4J is a schematic of a correlator.

The correlator 352 multiplies at least a portion of the bi-polar version of the binary code by the CCS samples ($p_{n,k}$) in the second delay cells 306. FIG. 4J shows a portion of the bi-polar version of the binary code for the purposes of simplicity. Each digit in the binary code is associated with one of the second delay cells 406 as shown in FIG. 4J. The correlator 352 includes several multipliers 408 that each multiplies one of the digits from the binary code by the contents of the associated second delay cell 406. The correlator also includes an adder 409 that adds the multiplication results so as to generate the alignment indicator.

After generating an alignment indicator, the CCS samples ($p_{n,k}$) in the delay cells 402 are each shifted in the same direction by the same amount. For instance, the CCS samples ($p_{n,k}$) in the delay cells 402 can each be shifted by one or more cells within the first tapped delay line 400. In some instances, the CCS samples ($p_{n,k}$) in the delay cells 402 are each shifted by a single cell. As a result, one or more CCS samples ($p_{n,k}$) exit the first tapped delay line 400 and one or more CCS samples ($p_{n,k}$) enter the first tapped delay line 400 from the convolved code signal. The changing of the CCS samples ($p_{n,k}$) in the delay cells 402 leads to a change in the CCS samples ($p_{n,k}$) in the second delay cells 406. The multipliers 408 each multiplies the digits from the binary code by the contents of the associated second delay cell 406 and the adder 409 adds the multiplication results.

The convolved code signal that carries the CCS samples ($p_{n,k}$) carries a version of the binary code because the $p_{n,k}$ values are a product of $d_{n,k}=A^2 e^{j\omega d^* T_P} e^{j\beta_n}$ values where the $\beta_n$ have values that correspond to the digits of the binary code. For instance, the $\beta_n$ values of 0 radians can correspond to binary code values of 0 and $\beta_n$ values of $\pi$ radians can correspond to binary code values of 1. As a result, the multiplication of the bi-polar version of the binary code by the convolved code signal is effectively a multiplication of two different versions of the binary code. As a result, an alignment indicator results from the multiplications and addition performed by the multipliers 408 and adder 409. Accordingly, the adder 409 outputs the alignment indicator.

The CCS samples ($p_{n,k}$) in the second delay cells 406 are shifted again and yet another alignment indicator is generated.

The process of shifting the CCS samples ($p_{n,k}$) in the second delay cells and generating an alignment indicator is repeated so as to generate data indicating the value of the alignment indicator as a function of time. As a result, the correlation signal output from the correlator indicates a series of alignment indicators that can each be represented by $a_q$ where q is an alignment indicator index. The series of alignment indicator values in the correlation signal indicates the value of the alignment indicator versus the degree of shifting.

The correlation signal is received by a power component 356. The power component outputs a power signal that indicates a power level of the correlation signal versus the degree of shifting. For instance, the power component can calculate the value of $Re^2+Im^2$ for all or a portion of the alignment indicators ($a_q$) where Re represents the real component of the alignment indicator a q and Im represents the imaginary component of the alignment indicator $a_q$. Accordingly, a value of $Re^2+Im^2$ can be generated for the values of the alignment indicators ($a_q$) in the correlation signal. The determination of $Re^2+Im^2$ removes the $\omega_d * T_p$ term that is present in the phase ($\phi_n$) of the samples ($s_{n,k}=Ae^{j\phi n}$) from the calculation of the LIDAR data.

Figure 4K:
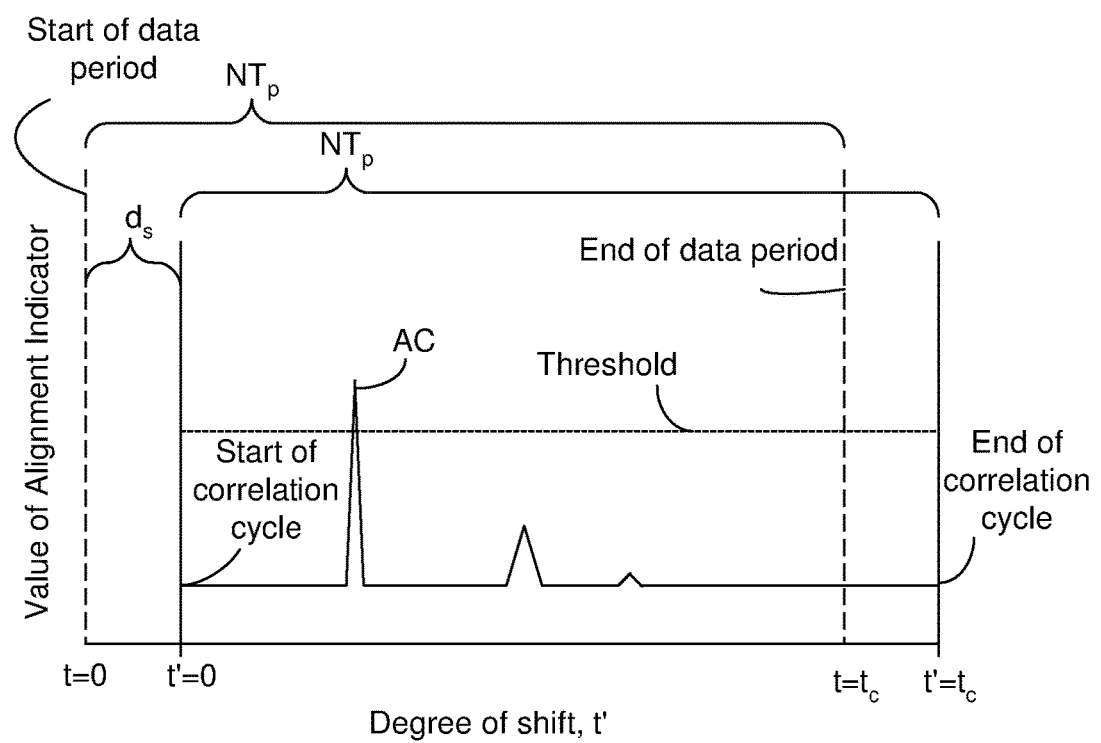
FIG. 4K is a graph showing that includes an example of the power signal versus time.

FIG. 4K is a graph that includes an example of the power signal versus time. Accordingly, the graph includes a curve showing the value of the alignment indicators ($a_q$) versus time. The graph includes a location labeled "start of data period" and a location labeled "end of data period." The "start of data period" can indicate the start of a data period such as the data period disclosed in the context of FIG. 4C. As a result, the "start of data period" can indicate when the system output signal with a synchronization signal contribution carrying bit $b_1$ is transmitted from the LIDAR system. The "end of data period" can indicate the end of the data period at time $t=tDP_{j,k}+t_{DP}$. The graph also includes a location labeled "start of correlation cycle" and a location labeled "end of correlation cycle." The "start of correlation cycle" can indicate when the CCS sample ($p_{1,1}$) enters the second delay cells 406. The "end of cycle" can indicate when the CCS sample ($p_{N,M}$) enters the second delay cells 406. In some instances, the duration of the correlation cycle is equal to the duration of the data period so the data from sequential data periods can be calculated in series.

There is a system delay labeled $d_s$ between the "start of data period" and the "start of correlation cycle." The system delay ($d_s$) can be the result of delays from one or more sources selected from the group consisting of delays in electronics such as a delay caused by the matched filter, delays from other sources, and/or delays induced by the system or system operator.

The degree of shifting shown on the x-axis can be represented by the number of CCS sample ($p_{n,k}$) shifts that occur after the shift where the CCS sample $p_{1,1}$ enters the second delay cells 406. The time increases with increasing numbers of shifts and the time increase can be linear or substantially linear. As a result, the degree of shifting can also represent correlation time (t') where the correlation time (t') is equal to 0 at the "start of correlation cycle." When the duration of the correlation cycle is equal to the duration of the data period, the correlation time (t') can be equal to $t_{DP}$ at the "end of correlation cycle."

The power signal includes a peak labeled AC. The AC peak is a result of the convolved code signal that carries the CCS samples ($p_{n,k}$) carrying a version of the binary code. Since the binary code has good autocorrelation properties and the convolved code signal carries a version of the binary code, the CCS samples ($p_{n,k}$) in the convolved code signal have similar autocorrelation properties. A characteristic of good autocorrelation properties is that the alignment indicators peak when different versions of the code are aligned. Since the power signal values are derived from the alignment indicators provided by the convolved code signal, the power signal also shows a peak when there is alignment between the CCS samples ($p_{n,k}$) carried in convolved code signal and the bi-polar version of the binary code. Accordingly, the peak labeled AC in FIG. 4H corresponds to alignment between the bi-polar version of the binary code and the code carried in the convolved code signal.

The power signal is received at the peak finder 358 of FIG. 4G. As is shown in FIG. 4K, the power signal can include one or more peaks that are a result of noise and/or other reflecting objects in the power signal. The peak finder is configured to identify one or more peaks in the power signal with a power level above a noise threshold. Each peak above the noise threshold results from the system output signal being reflected by an object located outside of the LIDAR system. When the $\omega_d$ term is not removed from the results, the associated sinusoid increases the difficulty of finding these peaks. The elimination of this sinusoid from the results increases the accuracy of the peak identification. Suitable peak finders 358 include, but are not limited to, peak finding algorithms.

The output of the peak finder 358 is received at the delay identifier 360 of FIG. 4G. The delay identifier 360 determines the value of the correlation time (t') at the identified peak. When the duration of the correlation cycle is equal to the duration of the data period, the value of the correlation time (t') when alignment occurs between the convolved code signal and the bipolar version of the two-digit signal represents or substantially represents the amount of delay between the code being transmitted from the LIDAR system and returning to the LIDAR system. Accordingly, the delay identifier 360 can output a return identification signal that indicates the delay time ($\tau_{j,k}$). The delay time indicator can quantify the delay time but need not actually quantify time. For instance, the delay time indicator can be other data that represent the delay time. As an example, the delay time indicator can indicate the number of bits that are transmitted before alignment occurs.

As shown in FIG. 4G, the separator 236 includes a third filter 362 that receives the first data signal and a fourth filter 364 that receives the second data signal. The third filter 362 is selected to filter from the first data signal the synchronization signal contributions, the synchronization reference signal contributions, and the undesired higher frequency components discussed in the context of FIG. 4F. As a result, the third filter 362 passes the LIDAR signal contribution and the LIDAR reference signal contribution in a third filtered signal. The fourth filter 364 is selected to filter from the second data signal the synchronization signal contributions, the synchronization reference signal contributions, and the undesired higher frequency components discussed in the context of FIG. 4F. As a result, the fourth filter 364 passes the LIDAR signal contribution and the LIDAR reference signal contribution in a fourth filtered signal. As is evident from FIG. 4F, the LIDAR signal band is at DC so upconversion and/or downconversion is not needed before the filtering of the first data signal and/or the second data signal. Suitable third filters 362 and/or fourth filters 364 include, but are not limited to, lowpass filters, and filter pairs with matching responses.

The third filtered signal and the fourth filtered signal together serve as a second complex filtered signal. The second complex filtered signal is received at the frequency identifier 250. The frequency identifier 250 includes a memory 370 configured to store the second complex filtered signal. Suitable memories include, but are not limited to, buffers.

The frequency identifier 250 includes a window identifier 371 that receives the return identification signal that indicates the delay time ($\tau_{j,k}$) from the return identifier 242. The window identifier 371 uses the delay time ($\tau_{j,k}$) to identify the data window (labeled $t_{DG}$ in FIG. 4C). For instance, the window identifier 371 can set the data window ($t_{DG}$) as extending from the delay time ($\tau_{j,k}$) to the end of the data period or some smaller window within the time period extending from the delay time ($\tau_{j,k}$) to the end of the data period. As an example, the window identifier 371 can set the data window ($t_{DG}$) as extending from the time (tDP$_{j,k}$+$\tau_{j,k}$) to time (tDP$_{j,k}$+$t_{DP}$) or some smaller portion of the time period within the time from (tDP$_{j,k}$+$\tau_{j,k}$) to (tDP$_{j,k}$+$t_{DP}$). In some instances, a data window is selected to have a duration that exceeds the length of time between $\tau_M$ and the end of the data period while being smaller than the length of time from (tDP$_{j,k}$+$\tau_{j,k}$) to time (tDP$_{j,k}$+$t_{DP}$). An example of a smaller portion of the data window within the time (tDP$_{j,k}$+$\tau_{j,k}$) to time (tDP$_{j,k}$+$t_{DP}$) includes a data window from data window within the time (tDP$_{j,k}$+$\tau_{j,k}$+dly) to time (tDP$_{j,k}$+$t_{DP}$) where dly represents a programmed delay.

In the above data window examples, the identified data window ($t_{DG}$) is a function of the delay time ($\tau_{j,k}$). Since the value of the delay time ($\tau_{j,k}$) is a function of the distance between the LIDAR system and a reflecting object, the identified data window ($t_{DG}$) is also a function of the distance between the LIDAR system and a reflecting object. Accordingly, the data window ($t_{DG}$) is dynamic and changes during operation of the LIDAR system.

The frequency identifier 250 includes a transform mechanism 372 that receives the identified data window from the window identifier 371. The transform mechanism 372 identifies the portion of the second complex filtered signal that is stored in the memory 370 and was generated from system return signals that returned to the LIDAR system during the identified data window.

The transform mechanism 372 includes a mathematical operation component 374 configured to receive the identified portion of the second complex filtered signal. The mathematical operation component 374 is configured to perform a mathematical operation on the identified portion of the second complex filtered signal. Examples of suitable mathematical operations include, but are not limited to, mathematical transforms such as Fourier transforms. The mathematical transform can be a complex transform such as a complex Fast Fourier Transform (FFT). A complex Fast Fourier Transform (FFT) can provide an output that indicates magnitude as a function of frequency. As a result, a peak in the output of the complex transform can occur at and/or indicate the correct solution for the LIDAR beat frequency. The mathematical operation component 374 can execute the attributed functions using firmware, hardware or software or a combination thereof.

The output of the mathematical operation component 374 is received at a LIDAR data component 376. The LIDAR data component 376 can perform a peak find on the output of the mathematical operation component 374 to identify the peak in the frequency of the output of the mathematical operation component 374. The LIDAR data component 376 treats the frequency at the identified peak as the LIDAR beat frequency.

The LIDAR data component 376 can use the identified beat frequencies in combination with the frequency pattern of the system to generate the LIDAR data. The electronics can combine the LIDAR beat frequencies ($f_{LDP}$) from two or more different data periods to generate LIDAR data. For instance, the beat frequency determined from DP$_1$ in FIG. 4C can be combined with the beat frequency determined from DP$_2$ in FIG. 4C to determine the LIDAR data. As an example, the following equation applies during a data period where electronics increase the frequency of the LIDAR signal contribution during the data period such as occurs in data period DP$_1$ of FIG. 4C: $f_{ub}=-f_d+\alpha\tau$ where $f_{ub}$ is the LIDAR beat frequency determined from DP$_1$ in this case, $f_d$ represents the Doppler shift ($f_d=2vf_0/c$) where $f_0$ represents the base frequency, c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the LIDAR signal contribution such as occurs in data period DP$_2$ of FIG. 4C: $f_{db}=-f_d-\alpha\tau$ where $f_{db}$ is the LIDAR beat frequency determined from DP$_2$ in this case. In these two equations, $f_d$ and $\tau$ are unknowns. The electronics solve these two equations for the two unknowns. The radial velocity for the sample region then be quantified from the Doppler shift ($v=c*f_d/(2f_0)$) and/or the separation distance for that sample region can be quantified from $c*\tau/2$.

In some instances, more than one object is present in a sample region. In these cases, more than one LIDAR beat frequency may be present in a data period. Each of the LIDAR beat frequencies can be associated with a different object. The LIDAR beat frequencies that result from the same object in different data periods of the same cycle can be considered corresponding frequency pairs. LIDAR data can be generated for each corresponding frequency pair output by the transform. As a result, separate LIDAR data can be generated for each of the objects in a sample region.

The data period labeled DP$_3$ in FIG. 4C is optional and allows the LIDAR beat frequencies belonging to corresponding frequency pairs to be identified. For instance, during the feedback period in DP$_1$ for cycle$_2$ and also during the feedback period in DP$_2$ for cycle$_2$, more than one frequency pair can be matched. In these circumstances, it may not be clear which LIDAR beat frequency from DP$_2$ corresponds to which LIDAR beat frequency peaks from DP$_1$. As a result, it may be unclear which LIDAR beat frequencies need to be used together to generate the LIDAR data for an object in the sample region. As a result, there can be a need to identify corresponding frequencies. The identification of corresponding frequencies can be performed such that the corresponding frequencies are frequencies from the same reflecting object within a sample region. The data period labeled DP$_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods (DP$_1$, DP$_2$, and DP$_3$) as shown in FIG. 4C. When there are two objects in a sample region illuminated by the system output signal, two different LIDAR beat frequencies can be determined for $f_{ub}$: $f_{u1}$ and $f_{u2}$ during DP$_1$ and another two different LIDAR beat frequencies for $f_{db}$: $f_{d1}$ and $f_{d2}$ during $DP_2$. In this instance, the possible frequency pairings are: $(f_{d1}, f_{u1})$; $(f_{d1}, f_{u2})$; $(f_{d2}, f_{u1})$; and $(f_{d2}, f_{du2})$. A value of $f_d$ and $\tau$ can be calculated for each of the possible frequency pairings. Each pair of values for $f_d$ and $\tau$ can be substituted into $f_3 = -f_d + \alpha_3 \tau_0$ to generate a theoretical $f_3$ for each of the possible frequency pairings. The value of $\alpha_3$ is different from the value of $\alpha$ used in $DP_1$ and $DP_2$. In FIG. 3C, the value of $\alpha_3$ is zero. In this case, the transform components 268 also outputs two values for $f_3$ that are each associated with one of the objects in the sample region. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region. Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region.

As noted above, the power signal versus time graph shown in FIG. 4H may have multiple peaks that are above the noise threshold as a result of the system output signal being reflected by multiple objects. As a result, the delay identifier 260 may output multiple roundtrip times that are each associated with a different one of the objects. The LIDAR system can be configured to generate LIDAR data for each of the different objects. For instance, the electronics can include multiple distance finders 262 that each determines the distance between the object and the LIDAR system for one of the objects and/or multiple velocity calculators 264 that each determines a radial velocity between the object and the LIDAR system for one of the objects. Additionally or alternately, the electronics can include a distance finder 262 that serially determines the distance between one of the objects and the LIDAR system for two or more of the objects and/or a velocity calculator 264 that serially determines the radial velocity between one of the object and the LIDAR system for two or more of the objects.

The data period labeled $DP_2$ in FIG. 4C is also optional. For instance, the LIDAR data component 376 can determine the delay time ($\tau_{j,k}$) from the return identification signal and determine the separation distance from $c*\tau_{j,k}/2$. The radial velocity can then be determined from $DP_1$. For instance, the following equation applies during a data period where electronics increase the frequency of the LIDAR signal contribution during the data period such as occurs in data period $DP_1$ of FIG. 4C: $-f_{ub} + \alpha \tau_{j,k} = f_d$ where $f_{ub}$ is the LIDAR beat frequency determined from $DP_1$ in this case, $f_d$ represents the Doppler shift ($f_d = 2vf_0/c$) where $f_0$ represents the base frequency, c represents the speed of light, v is the radial velocity between the reflecting object and the LIDAR system where the direction from the reflecting object toward the LIDAR system is assumed to be the positive direction, and c is the speed of light. This equation can be solved for $f_d$ and the radial velocity for the sample region then be quantified from ($v = c*f_d/(2f_0)$). Since the data period labeled $DP_2$ and the data period labeled $DP_3$ are optional, each cycle can include a single data period.

As is evident from the above discussions, in some instances, a single electrical line illustrated above carries a complex signal.

Figure 5:
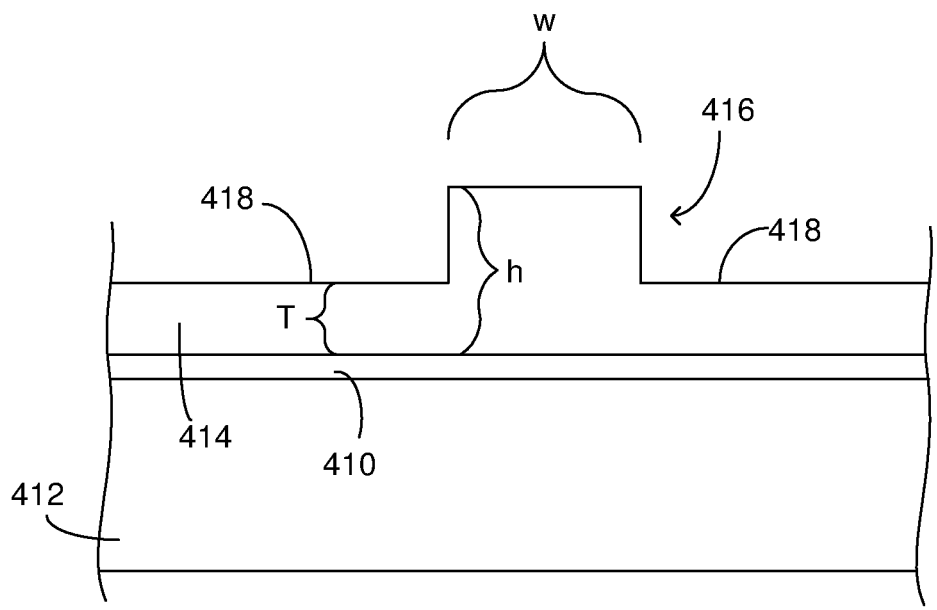
FIG. 5 is a cross-section of portion of a LIDAR chip constructed from a silicon-on-insulator wafer.

Suitable platforms for the LIDAR chips include, but are not limited to, silica, indium phosphide, and silicon-on-insulator wafers. FIG. 5 is a cross-section of portion of a LIDAR chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the above LIDAR chips can be positioned on or over the top and/or lateral sides of the substrate 312.

FIG. 5 is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried oxide layer 310.

The dimensions of the ridge waveguide are labeled in FIG. 5. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.1 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 5 is suitable for all or a portion of the waveguides on the above LIDAR chips.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor and the second light sensor.

A light source selected from a group consisting of a reference light source 3, a synchronization light source 5, and a light source 7 that is interfaced with a ridge waveguide can be a gain element that is a component separate from the LIDAR chip and then attached to the LIDAR chip. For instance, the light source can be a gain element or laser chip that is attached to the LIDAR chip using a flip-chip arrangement.

Use of flip-chip arrangements is suitable when a light source is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

Components such as a phase modulator 11 and an intensity modulator 12 can be a component that is separate from the LIDAR chip and then attached to the chip. For instance, the attenuator can be included on an attenuator chip that is attached to the chip in a flip-chip arrangement.

Suitable electronics can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the synchronization signal is disclosed in the context of code division multiplexing with a binary code, the LIDAR system can use multi-digit codes with more than two digits. For instance, the LIDAR system can use quadrature phase shift keying to encode the system output signal.

The LIDAR system is disclosed as having data periods that each has the same duration ($t_{DP}$), however, different data periods in the same cycle can have different durations.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:
    a LIDAR system configured to output a system output signal and to receive a system return signal,
        the system return signal including light that was included in the system output signal and that was reflected by an object located outside of the LIDAR system,
        the system output signal including a contribution from a LIDAR signal and a synchronization signal,
            the contribution from LIDAR signal and the contribution from the synchronization signal being at different wavelengths, and
        a time delay occurring between the light being output from the LIDAR system and returning to the LIDAR system; and
    electronics configured to generate LIDAR data from a portion of the system return signal that returns to the LIDAR system during a data window,
        the electronics tuning a duration of the data window in response to the amount of the time delay, and
        the LIDAR data indicates a radial velocity and/or distance between the LIDAR system and the object.

2. The system of claim 1, wherein the LIDAR system is configured such that the system return signal includes a contribution from the LIDAR signal and a contribution from the synchronization signal and the electronics use the contribution of the synchronization signal to the system return signal to identify an amount of the time delay.

3. The system of claim 2, wherein the electronics do not use the contribution of the LIDAR signal to the system return signal to identify the amount of the time delay.

4. The system of claim 2, wherein the electronics operate one or more components such that the contribution of the synchronization signal to the system return signal carries a binary code.

5. The system of claim 4, wherein the electronics operate the one or more components such that a phase of the synchronization signal carries the binary code.

6. The system of claim 5, wherein the binary code is encoded into the phase of the synchronization signal according to differential phase shift keying.

7. The system of claim 4, wherein the contribution of the LIDAR signal to the system return signal does not carry the binary code.

8. The system of claim 1, wherein the electronics are configured to tune the data window such that the duration of the data window increases as the object becomes closer to the LIDAR system.

9. The system of claim 8, wherein the electronics are configured to tune the data window such that the system return signal is received by the LIDAR system for the full duration of the data window.

10. The system of claim 1, wherein the LIDAR system is configured to combine the system return signal with a reference signal that has not been output from the LIDAR system.

11. The system of claim 10, wherein the LIDAR system is configured such that the reference signal includes a contribution from a LIDAR reference signal and from a synchronization reference signal, the contribution from LIDAR reference signal and the contribution from the synchronization reference signal being at different wavelength.

12. The system of claim 11, wherein the LIDAR system is configured such that the contribution of the LIDAR signal to the system output signal and the contribution of the LIDAR reference signal to the system output signal each includes light from an outgoing light signal.

13. The system of claim 12, wherein the system is configured such that the synchronization signal and the synchronization reference signal do not include light from a common light signal.

14. The system of claim 1, wherein the electronics include a separator configured to operate on an electrical signal that includes a contribution from the LIDAR signal and a contribution from the synchronization signal, and
the electronics operating on the electrical signal so as to separate the contribution of the LIDAR signal to the electrical signal from the contribution of the synchronization signal to the electrical signal.

15. A method, comprising:
outputting a system output signal from a LIDAR system and receiving a system return signal at the LIDAR system,
the system return signal including light that was included in the system output signal and that was reflected by an object located outside of the LIDAR system, and
a time delay occurring between the light being output from the LIDAR system and returning to the LIDAR system; and
generating LIDAR data from a portion of the system return signal that returns to the LIDAR system during a data window,
the LIDAR data indicating a radial velocity and/or distance between the LIDAR system and the object; and
generating the LIDAR data includes tuning a duration of the data window in response to the amount of the time delay,
the data window being tuned such that the duration of the data window increases as the object becomes closer to the LIDAR system.

16. The method of claim 15, wherein the data window is tuned such that the system return signal is received by the LIDAR system for the full duration of the data window.

17. The method of claim 15, wherein the system output signal includes a contribution from a LIDAR signal and a synchronization signal,
the LIDAR signal and the synchronization signal having different wavelengths.

18. The method of claim 17, wherein the system return signal includes a contribution from the LIDAR signal and the synchronization signal and the synchronization signal contribution is used to identify an amount of the time delay but the contribution is not used to identify the amount of the time delay.

19. A system, comprising:
a LIDAR system configured to output a system output signal and to receive a system return signal,
the system return signal including light that was included in the system output signal and that was reflected by an object located outside of the LIDAR system, and
a time delay occurring between the light being output from the LIDAR system and returning to the LIDAR system,
the LIDAR system being configured to combine the system return signal with a reference signal that has not been output from the LIDAR system,
the reference signal including a contribution from a LIDAR reference signal and from a synchronization reference signal, the contribution from LIDAR reference signal and the contribution from the synchronization reference signal being at different wavelengths;
electronics configured to generate LIDAR data from a portion of the system return signal that returns to the LIDAR system during a data window,
the electronics tuning a duration of the data window in response to the amount of the time delay, and
the LIDAR data indicates a radial velocity and/or distance between the LIDAR system and the object.

20. The system of claim 19, wherein the LIDAR system is configured such that the system return signal includes a contribution from the LIDAR signal and a contribution from the synchronization signal and the electronics use the contribution of the synchronization signal to the system return signal to identify an amount of the time delay.

21. The system of claim 20, wherein the electronics do not use the contribution of the LIDAR signal to the system return signal to identify the amount of the time delay.

22. The system of claim 20, wherein the electronics operate one or more components such that the contribution of the synchronization signal to the system return signal carries a binary code.

23. The system of claim 22, wherein the electronics operate the one or more components such that a phase of the synchronization signal carries the binary code.

24. The system of claim 23, wherein the binary code is encoded into the phase of the synchronization signal according to differential phase shift keying.

25. The system of claim 22, wherein the contribution of the LIDAR signal to the system return signal does not carry the binary code.

26. The system of claim 19, wherein the electronics are configured to tune the data window such that the duration of the data window increases as the object becomes closer to the LIDAR system.

27. The system of claim 26, wherein the electronics are configured to tune the data window such that the system return signal is received by the LIDAR system for the full duration of the data window.

28. The system of claim 19, wherein the LIDAR system is configured such that the contribution of the LIDAR signal to the system output signal and the contribution of the LIDAR reference signal to the system output signal each includes light from an outgoing light signal.

29. The system of claim 19, wherein the system is configured such that the synchronization signal and the synchronization reference signal do not include light from a common light signal.

30. The system of claim 19, wherein the electronics include a separator configured to operate on an electrical signal that includes a contribution from the LIDAR signal and a contribution from the synchronization signal, and the electronics operating on the electrical signal so as to separate the contribution of the LIDAR signal to the electrical signal from the contribution of the synchronization signal to the electrical signal.

\* \* \* \* \*